(12) United States Patent
Ellis

(10) Patent No.: US 11,760,583 B2
(45) Date of Patent: Sep. 19, 2023

(54) MATERIAL CONVEYING APPARATUS WITH SHUT DOWN VALVES

(71) Applicant: SCHENCK PROCESS EUROPE GMBH, Darmstadt (DE)

(72) Inventor: Richard Ellis, Darmstadt (DE)

(73) Assignee: SCHENCK PROCESS EUROPE GMBH, Darmstadt (DE)

( * ) Notice: Subject to any disclaimer, the term of this patent is extended or adjusted under 35 U.S.C. 154(b) by 0 days.

(21) Appl. No.: 17/607,597

(22) PCT Filed: May 1, 2020

(86) PCT No.: PCT/EP2020/062213
§ 371 (c)(1),
(2) Date: Oct. 29, 2021

(87) PCT Pub. No.: WO2020/225158
PCT Pub. Date: Nov. 12, 2020

(65) Prior Publication Data
US 2022/0219918 A1     Jul. 14, 2022

(30) Foreign Application Priority Data
May 3, 2019    (GB) ..................................... 1906310

(51) Int. Cl.
*B65G 53/52*     (2006.01)
*B65G 53/58*     (2006.01)
*B65G 53/66*     (2006.01)

(52) U.S. Cl.
CPC ........... *B65G 53/526* (2013.01); *B65G 53/58* (2013.01); *B65G 53/66* (2013.01)

(58) Field of Classification Search
USPC ...................................................... 406/94–95
See application file for complete search history.

(56) References Cited

U.S. PATENT DOCUMENTS 3,295,896 A * 1/1967 Hurtig .................. B65G 53/525
                                                  406/50
3,537,755 A * 11/1970 Schmidt .................. C10B 31/00
                                                  406/109

(Continued)

FOREIGN PATENT DOCUMENTS

CN     105059941 A   * 11/2015
CN     105059941 A     11/2015

(Continued)

OTHER PUBLICATIONS

Great Britain Examination Report and Search Report dated Oct. 28, 2019 for Patent Application No. GB1906310.6.

(Continued)

*Primary Examiner* — Joseph A Dillon, Jr.
(74) *Attorney, Agent, or Firm* — Barnes & Thornburg, LLP

(57) ABSTRACT

Disclosed is a system and method for conveying particulate material. A plurality of injector arrangements are arranged along the conveying pipeline, for injecting a continuous flow of conveying gas into the pipeline. Each injector arrangement is operable to increase the flow rate at which conveying gas is injected into the pipeline on of pressure conditions in the conveying pipeline indicative of locally decreased material permeability. Each injector arrangement comprises a piloted shut-off valve positioned between the flow rate adjustment arrangement and the conveying pipeline and operable to close in response to a received pilot signal indicative of a pressure condition in the conveying pipeline below a lower threshold pressure condition. The continuous flow of conveying gas injected by each of the injector arrangements prevents particulate material from entering any part of the injector arrangements, thereby reducing the risk of blockage of nozzles, injection pathway selection valves and the like. The continuous injection of conveying (Continued)

gas along the pipeline also maintains a degree of permeability particulate material in the pipeline and promotes stable conveying. The piloted shut-off valve of each injector arrangement is operable to independently detect a large pressure drop in the pipeline, and to close in order to store pressurised conveying gas in the injector arrangement and supply thereto.

20 Claims, 9 Drawing Sheets

(56) References Cited

U.S. PATENT DOCUMENTS

| | | | | |
|---|---|---|---|---|
| 3,929,379 | A * | 12/1975 | Krambrock | B65G 53/525 406/95 |
| 4,389,143 | A * | 6/1983 | Nadin | B65G 53/525 406/197 |
| 4,389,949 | A * | 6/1983 | Heep | F23N 1/002 110/101 CC |
| 4,420,279 | A * | 12/1983 | Easley, Jr. | B65G 53/525 406/14 |
| 4,515,503 | A | 5/1985 | Snowdon | |
| 4,599,017 | A * | 7/1986 | Russemeyer | B65G 53/525 406/156 |
| 4,715,748 | A * | 12/1987 | Krambrock | B65G 53/525 406/14 |
| 4,852,994 | A * | 8/1989 | Lambertz | C10J 3/482 252/373 |
| 4,861,200 | A | 8/1989 | Lubbehusen et al. | |
| 4,909,676 | A | 3/1990 | Heep et al. | |
| 4,955,761 | A | 9/1990 | Federhen et al. | |
| 5,190,415 | A * | 3/1993 | Allerton | B65G 53/58 406/118 |
| 5,224,802 | A * | 7/1993 | Federhen | B65G 53/525 406/14 |
| 5,240,355 | A * | 8/1993 | Hudalla | B65G 53/521 406/93 |
| 5,562,366 | A * | 10/1996 | Paulson | B65G 53/525 406/28 |
| 5,584,612 | A * | 12/1996 | Nolan | B65G 53/66 406/11 |
| 5,775,851 | A * | 7/1998 | Waeschle | B65G 53/521 406/14 |
| 5,906,858 | A * | 5/1999 | Huber | B05B 13/0618 406/14 |
| 6,106,202 | A | 8/2000 | Nolan | |
| 6,287,056 | B1 * | 9/2001 | Szikszay | B65G 53/66 406/146 |
| 6,386,800 | B1 | 5/2002 | van Eyck | |
| 6,749,373 | B2 * | 6/2004 | Von Geldern | B65G 53/528 110/186 |
| 6,786,681 | B2 * | 9/2004 | Grasshoff | B65G 53/521 406/127 |
| 6,935,813 | B2 | 8/2005 | Van Dorst | |
| 7,192,222 | B2 * | 3/2007 | Van Mullekom | B65G 53/521 406/197 |
| 7,329,071 | B2 * | 2/2008 | Sonnichsen | B65G 53/521 406/89 |
| 7,413,388 | B2 * | 8/2008 | Krebs | B65G 53/08 406/60 |
| 7,850,047 | B2 * | 12/2010 | Boroch | B65G 53/66 222/57 |
| 9,382,079 | B2 * | 7/2016 | Bjarno | C25C 3/14 |
| 10,092,934 | B2 * | 10/2018 | Thorn | B08B 9/0557 |
| 10,138,077 | B2 * | 11/2018 | Ellis | B65G 53/4691 |
| 10,155,912 | B2 * | 12/2018 | Schweizer | C10J 3/50 |
| 10,696,496 | B2 * | 6/2020 | Ellis | B65G 53/521 |
| 11,365,071 | B2 * | 6/2022 | Brewster | B65G 53/24 |
| 2014/0284197 | A1 * | 9/2014 | Chalabi | C10B 49/08 202/99 |

FOREIGN PATENT DOCUMENTS

| | | | | |
|---|---|---|---|---|
| CN | 109689542 | A | | 4/2019 |
| DE | 2919696 | A1 | | 2/1980 |
| DE | 10042459 | A1 * | 3/2002 | B65G 53/525 |
| DE | 102004047457 | A1 | | 4/2006 |
| DE | 10349871 | B4 * | 10/2009 | B65G 53/06 |
| EP | 0060135 | B1 * | 9/1985 | |
| EP | 0567367 | B1 * | 4/1993 | |
| EP | 0526808 | B1 * | 9/1995 | |
| GB | 1454114 | A | | 10/1976 |
| GB | 1524585 | A | | 9/1978 |
| GB | 2038750 | A | | 7/1980 |
| GB | 2002881 | B | | 2/1982 |
| GB | 2085388 | A | | 4/1982 |
| JP | 57195030 | A * | 11/1982 | |
| JP | 58212526 | A * | 12/1983 | |
| JP | S6118635 | A | | 1/1986 |
| JP | 01127523 | A * | 5/1989 | |
| JP | 04213520 | A * | 8/1992 | |
| WO | 2018007787 | A1 | | 1/2018 |

OTHER PUBLICATIONS

International Search Report for PCT Application No. PCT/EP2020/062213, dated Jul. 23, 2020.

Office Action from corresponding Chinese Application No. 202080032841.4, dated Oct. 8, 2022.

* cited by examiner

MATERIAL CONVEYING APPARATUS WITH SHUT DOWN VALVES

CROSS REFERENCE TO RELATED APPLICATIONS

This application is a National Stage application of International Application No. PCT/EP2020/062213, filed May 1, 2020. This application also claims priority under 35 U.S.C. § 119 to GB Patent Application No. 1906310.6, filed May 3, 2019, the contents of which are hereby incorporated by reference.

FIELD OF THE INVENTION

The invention relates to apparatus and methods for conveying particulate material through a pipeline, and in particular to the use of pressurisation or vacuum techniques to convey dense phase particulate material.

BACKGROUND TO THE INVENTION

Pneumatic conveying by pressure or vacuum are techniques employed to transport particulate materials along a pipeline. These techniques are typically employed to transport materials over distances typically in the range from 10 m to 500 m, and in some cases even further. Pneumatic conveying avoids the need for the use of conveyor belts or the like, which can be bulky and costly to maintain.

Pneumatic conveying techniques are particularly useful where material has to be transported along a complex path, or to multiple delivery points. These techniques also ensure that the particulate material can be entirely contained within a pipeline, which may avoid the need to deal with dust from or contamination of the material along the path of the conveying pipeline.

Dense phase positive pressure or vacuum pneumatic conveying is often used to transport dense phase particulates that are not suitable for conveying by suspension in a gas flow, such as materials prone to aggregate or coagulate, or particularly abrasive or friable materials. In dense phase pneumatic conveying, such materials are conveyed along a pipeline at relatively low velocities, often in a series of "material slugs". By keeping the transport velocity low, both pipeline wear and energy consumption is reduced.

A conventional pressurised dense phase pneumatic conveying system 1 is shown in FIG. 1(a). A particulate material 3 is delivered from a hopper 5, into a pressure vessel 7 (commonly referred to as a "transporter") via a material shut-off valve 9. The pressure vessel is pressurised with compressed air, delivered for example from a compressor 11a via a control valve 13. The pressurised air in the pressure vessel 7 expands into the conveying pipeline 17 and the air flow propels particulate material 15 along the pipeline to a delivery point (e.g. a second hopper, 19).

Dense phase vacuum conveying uses a similar principle. As shown in FIG. 1(b), instead of the pressure differential between the inlet and outlet of the conveying pipeline being achieved by pressurising the transporter, in vacuum conveying the pipeline inlet is at ambient pressure and the pressure at the outlet (for example in the second hopper 19) is reduced, by a vacuum pump 11b.

Some materials are unsuitable for dense phase conveying without additional assistive technologies being applied directly to the conveying pipeline. For example, some materials have low permeability to the motive gas flow. When combined with high friction between the particulate material and the inner wall of the pipeline, movement of the material can become erratic and unpredictable, which may lead to variable conveying rate performance and/or pipeline blockages.

To seek to address these issues, it is known to inject compressed air through a plurality of delivery points positioned at intervals along the pipeline length. However, this approach often requires higher volumes and/or pressures of compressed air. This additional consumption arises because air is unnecessarily injected at some points along the pipeline. In turn, the additional air flow increases the particulate material velocity along the pipeline, which may lead to increased pipeline wear or damage caused by contact with the particulate material.

One approach to minimizing air consumption has been to provide injectors along a pipeline with pressure transducers, and to inject compressed air via non-return valves only at specific injectors, in response to pressure conditions in the pipeline. Examples of such systems are described in U.S. Pat. Nos. 4,515,503, 5,584,612 and GB2085388. Systems which trigger gas injection above an absolute threshold pipeline pressure can be difficult to implement, because the required threshold pressure decreases along a pipeline (requiring individual adjustment) and can be dependent on the type of material being conveyed. GB2085388, for example, teaches that reference values for the pressure above which compressed air is injected, are selected for each type of material being conveyed.

These systems have several further drawbacks. Since they work on the principle of detecting an increased pipeline pressure characteristic of a material plug, and "pushing" the plug along the pipeline by injection additional air, the tendency is for each injector in turn to be switched on and remain on as the plug progresses down the pipeline, leading to wastage of air. In addition, injectors and non-return valves are prone to blockage when not in use, from contaminated backflow from the conveying pipeline.

Systems such as those described above are also prone under some circumstances to exacerbate problems by injecting gas upstream of a material plug, thereby compacting it.

U.S. Pat. No. 4,861,200 describes a system in which the pressure differential between a reference line, which represents a predicted "idealised" pressure along the pipeline, and the actual pressure in a conveying pipeline is measured ($\Delta p_n$) at each of a series of groups of injectors arrayed along the pipeline. A larger than expected pressure drop along the pipeline is indicative of a blockage and so the pressure differential switches are arranged such that, where $\Delta p_n$ exceeds $\Delta p_{n+1}$ at the adjacent groups of injectors downstream by a predetermined amount, compressed air is injected through the upstream injectors. The comparison to a reference value means that each pressure difference $\Delta p$ must be calibrated to the "idealised" pressure drop along the pipeline, which is once again material-specific.

Conveying velocity and pressure may also be limited by allowing excess conveying gas pressure and volume to "bypass" a material plug, for example via an internal fluted pipeline or external pressure release valve-controlled bypass loops. Again, however, the "bypass" arrangements may be prone to blockage and wear. In the case of internal bypass pipelines, repair or replacement can be particularly difficult and costly.

The Applicant's earlier application WO 2018/007787 describes a material conveying apparatus that addresses a number of the drawbacks of previously known approaches. The apparatus is provided with injector arrangements along the conveying pipeline which are configured to injecting a continuous flow of conveying gas into the pipeline; and to switch between a lower and higher injection flow rate if an above-threshold pressure differential is detected along the conveying pipeline. This apparatus both reduces the overall amount of conveying gas required and provides for more stable conveying.

Whilst this apparatus provides a significant improvement over conventional conveying apparatus, in some circumstances still further control over the injection of conveying gas along the conveying pipeline may be desired.

SUMMARY OF THE INVENTION

According to a first aspect of the invention there is provided a system for conveying particulate material, comprising:
- a conveying pipeline having an inlet for receiving a quantity of particulate material and conveying gas, and an outlet; the system being configured to maintain the inlet at a higher pressure of conveying gas than the outlet;
- a plurality of injector arrangements along the conveying pipeline, for injecting a continuous flow of conveying gas into the pipeline;
- wherein each injector arrangement is associated with a pressure apparatus for detecting pressure conditions in the conveying pipeline; and
- wherein each injector arrangement comprises a flow rate adjustment arrangement operable to increase the flow rate at which conveying gas is injected into the pipeline from an injection flow rate to an increased injection flow rate, on detection by the pressure apparatus of pressure conditions in the conveying pipeline indicative of locally decreased material permeability; and
- wherein each injector arrangement comprises a piloted shut-off valve positioned between the flow rate adjustment arrangement and the conveying pipeline and operable to close in response to a received pilot signal indicative of a pressure condition in the conveying pipeline below a lower threshold pressure condition.

The continuous flow of conveying gas injected by each of the injector arrangements prevents particulate material from entering any part of the injector arrangements, thereby reducing the risk of blockage of nozzles, valves and the like. The continuous injection of conveying gas along the pipeline also maintains a degree of permeability particulate material in the pipeline and promotes stable conveying.

In pressurised or vacuum pneumatic conveying, the conveying gas flows along the conveying pipeline at a higher speed than the particulate material. Thus, the particulate material is, to some degree, "permeable" to the flow of conveying gas. A higher permeability implies a lower flow resistance, and may be associated with less particle compaction and friction. In turn, this results in a lower overall conveying pressure for a given mass flow rate. Conversely, a lower permeability implies a higher flow resistance, and may be associated with a greater degree of particle compaction and friction against the pipeline (typically resulting in higher overall conveying pressure).

If a local reduction in the permeability of the particulate material occurs as the conveyed particulate material begins locally to compact, plugs of material or pipeline blockages may eventually form. A local reduction in permeability may cause localised changes in pressure conditions in the pipeline, such as pressure differentials along the conveying pipeline. In use, when a local increase in material permeability is detected, an injector arrangement (typically in the region of, or upstream of the locally decreased permeability) increases the flow rate of injected conveying gas, to maintain material permeability, and prevent blockages from occurring.

The piloted shut-off valve of each injector arrangement is operable independently of the flow rate adjustment arrangement and pressure apparatus. That is to say, the pilot signal by which each piloted shut-off valve is regulated may be independent of any signals (e.g. electrical signals, pressure signals etc. as disclosed herein) by which the flow rate adjustment arrangement and pressure apparatus operate.

The piloted shut-off valve of each injector arrangement may be operable to detect a large pressure drop in the pipeline, i.e. a pressure condition below a suitable threshold pressure condition, and to close in order to store pressurised conveying gas in the injector arrangement and supply thereto. This arrangement therefore stores energy (in the form of pressured gas) in an injector arrangement and reduces gas consumption, by reducing or eliminating the need to re-pressurise the parts of the system associated with the injector arrangements following routine cessation of material conveying, or due to a fault such as serious leakage in the conveying pipeline, or when insufficient conveying gas is being supplied to the system.

In addition, storing pressurised gas an injector arrangement using the shut-off valves in this way ensures that the pressure in the injector arrangement is maintained above the pressure in the conveying pipeline at all times; preventing any contamination of the injector arrangement for example when the system is re-started or a given injector arrangement re-activated.

The piloted shut-off valve of each injector arrangement is typically also operable to open in response to a received pilot signal indicative of a pressure condition in the conveying pipeline above the lower threshold pressure condition.

The lower threshold pressure condition may be an absolute lower threshold pressure, such as a minimum conveying pipeline pressure (measured for example at or near the inlet of the conveying pipeline).

The lower threshold pressure condition may be a lower threshold pressure difference (i.e. pressure drop), such as between a pressure in a part of an injector arrangement and pressure in the conveying pipeline, such as in the vicinity of the injector arrangement. A lower threshold pressure difference may be a drop between an expected and an actual pipeline pressure. A lower threshold pressure difference may be a drop between the pipeline pressure at its inlet and another, downstream, part of the pipeline.

It will be understood that a lower threshold pressure condition will typically be related to the overall system pressure, or the pressure in the conveying pipeline. A lower threshold pressure condition may be between around 5-50% of the system pressure, or between around 10-40%, or 10-25% of the system pressure.

The shut-off valves may be configured to operate independently of one another and/or simultaneously. The shut-off valves may be configured to operate in groups; that is to say, sub-groups of the shut-off valves may be configured to operate simultaneously.

By "independently" we mean that the operation of each shut-off valve takes place regardless of the configuration of any other shut-off valve, and does not exclude two or more said shut-off valves operating independently of one another in response to corresponding pilot signals, but at or around the same time as one another.

As disclosed in further detail below, each piloted shut-off valve may be operable to respond to more than one type of pilot signal. Accordingly, in some embodiments, the shut-off valves operate simultaneously in response to one or more first pilot signals, and to operate independently in response to one or more second pilot signals.

The shut-off valves may be configured to receive a common pilot signal, so as to operate simultaneously. Alternatively, or in addition, the shut-off valves may be configured to operate simultaneously on receipt of a pilot signal by any one of the piloted shut-off valves.

A pilot signal may be transmitted by any suitable means, including but not limited to wirelessly, optically, electrically, pneumatically. The shut-off valve of each injector arrangement may be connected to a pilot line, such as an electrical pilot line (for conveying electrical signals), a pneumatic pilot line, an optical fibre. The shut-off valve of each injector arrangement may comprise or be coupled to a receiver, for receiving a wirelessly transmitted pilot signal.

A pilot signal may be a pressure signal, such as a decrease in pressure below a lower threshold pressure, or a pressure pulse, pressure difference, or the like.

For example, each piloted shut off valve may communicate with a pneumatic pilot line. The shut-off valve of each injector arrangement may be pressure-actuated. For example, the shut-off valve may be coupled to or comprise a diaphragm actuator or a pressure differential piston actuator or the like.

For example, the/each shut-off valve may be open if static pressure in the pilot line is above a lower threshold pressure, and/or below an upper threshold pressure or between an upper and a lower threshold pressure (and closed if the relevant condition is not met)

Each pilot line may extend from a pilot manifold, i.e. be in fluid communication with one another, or the pilot lines may be independent from one another.

Each shut-off valve (where present via a pilot line, or the pilot manifold), may be in communication (including in pressure communication, directly or via a diaphragm or piston actuator or the like, electrical communication, wireless communication or optical communication etc.) with another part of the system, such as;
  the conveying pipeline, such as an upstream part or the inlet to the conveying pipeline;
  an upstream part or the inlet to the respective injector arrangement;
  a transporter;
  a source of conveying gas for the system;
  a manifold supplying conveying gas to the injector arrangements;
  a manual "shut-off" device.

Thus, the received pilot signal may be directly, or indirectly indicative of a pressure condition in the conveying pipeline below a lower threshold pressure condition. For example, a manual shut-off device may be indicative that the pressure in the pipeline will subsequently drop. Similarly, a drop in pressure of a conveying gas source, the transporter or another upstream part of the system may similarly preface a drop in conveying pipeline pressure. In some embodiments, wherein the shut-off valves close as a consequence of a lower threshold pressure difference, a pilot line to an injector manifold may serve as a reference for the measurement of said lower threshold pressure difference.

A said pneumatic pilot line or manifold may be in pressure communication with the conveying pipeline. Each piloted shut-off valve may communicate with a pilot line, wherein the pilot line is in pressure communication with the conveying pipeline locally to each injector arrangement.

A pneumatic pilot line may be in pressure communication with a pilot manifold, by which simultaneous operation of each shut-off valve may be effected.

A pilot signal may be an electrical signal. Each shut-off valve may be an electromechanical valve.

The piloted shut-off valve of each injector arrangement may be configured to respond to a pilot signal indicative of a pressure condition in the conveying pipeline below the lower threshold pressure condition; and one or more further pilot signals.

One or more further pilot signals may for example include one or more pilot signals indicative of a fault condition.

A fault condition giving rise to a further pilot signal may comprise an adverse pressure condition or an adverse flow condition.

For example, each piloted shut-off valve may be operable to close in response to a received pilot signal indicative of a pressure condition in the pipeline above an upper threshold pressure condition. The piloted shut-off valve of each injector arrangement is typically also operable to open in response to a received pilot signal indicative of a pressure condition in the conveying pipeline below the upper threshold pressure condition.

An upper threshold pressure condition may be indicative of a blockage in the pipeline (as distinct from such smaller pressure variations associated with locally reduced permeability), or a fault associated with the conveying gas supply (e.g. a control valve and/or compressor). An upper threshold pressure condition may be indicative of a fault associated with an injector arrangement, such as a leak or a drop in supply of gas thereto.

As disclosed herein, under normal conveying conditions the system autonomously adjusts flow rate (between the injection flow rate and increased injection flow rate) at each of the injector arrangements. Fault conditions may arise whereby the injector arrangements are susceptible to contamination from material in the conveying pipeline (for example when conveying pipeline pressure exceeds injection pressure at one or more of the injector arrangements). The shut-off valve of each injector arrangement can advantageously close so as to prevent such contamination and damage of the injector arrangement.

The upper threshold pressure condition may be an absolute upper threshold pressure, such as a maximum conveying pipeline pressure (measured for example at or near the inlet of the conveying pipeline).

The upper threshold pressure condition may be an upper threshold pressure difference (i.e. pressure rise), such as between a pressure in a part of an injector arrangement and a pressure in the conveying pipeline, such as in the vicinity of the injector arrangement.

An upper threshold pressure e may be between around 105-150% of the system pressure, or between around 110-140%, or 110-125% of the system pressure. An upper threshold pressure differential may be between around 5-50% of the system pressure, or between around 10-40%, or 10-25% of the system pressure.

A fault condition giving rise to a further pilot signal might include a local pressure above another threshold pressure value (e.g. a value selected based on the pressure rating of a component of the system).

A fault condition might comprise a threshold manifold pressure or a threshold injector pressure. Or indeed a fault condition might be an adverse pressure difference, e.g. between two points in the system, such as the transporter and the conveying pipeline, or an inlet to and an outlet from an injector arrangement.

A fault condition might comprise a flow rate of conveying gas above or below a threshold flow rate, such as into or along the conveying pipeline, into or out of a transporter, or through an injector arrangement, etc. For example, if the flow rate of conveying gas were to exceed an upper threshold flow rate, this might indicate a leak, whereas a flow rate below a lower threshold flow rate might indicate a blockage or that insufficient conveying gas is being supplied to the system.

A fault condition might comprise a combination of two or more pressure or flow conditions.

A piloted shut-off valve may be adapted to operating even in the presence of particulate contaminants (as might be present under certain fault conditions). For example, a piloted shut-off valve may be a ball valve, a butterfly valve, a dome valves, a plug valve, a globe valve, or an angle seat valve.

The system may be configured for the shut-off valves to operate simultaneously, independently or in groups, in response to a received pilot signal or signals indicative of a fault condition, generally as discussed above in relation to the lower threshold pressure condition.

The nature of the pilot signal may dictate whether simultaneous, independent or grouped operation is required. For example, some faults may necessitate immediate closure of all of the shut-off valves, whereas others may arise from faults local to an injector arrangement, such that independent closure is appropriate.

The shut-off valves may be configured to be manually operated (in groups, simultaneously, and/or individually). For example, the system may comprise a manual (e.g. emergency) device for initiating a pilot signal.

It will be understood that the system may comprise fault detection apparatus, including for example one or more pressure and/or flow rate sensors, to detect a fault condition or conditions. Each injector arrangement may comprise, or be associated with, a said fault detection apparatus.

The fault detection apparatus may communicate with the/each sensor electronically. The fault detection apparatus may comprise, or communicate with, a controller, having a processing module capable of detecting the/each fault condition based on received sensor readings.

The pressure conditions indicative of decreased permeability may be an absolute pressure reading at one or more points along the conveying pipeline, for example a pressure reading above an expected pressure at a point along the conveying pipeline, or a differential between absolute pressure readings at two points along the conveying pipeline.

The pressure conditions indicative of decreased permeability may be a pressure differential, for example between two points along the pipeline or between two injector arrangements, such as adjacent injector arrangements.

Each injector arrangement may be associated with a pressure differential apparatus for detecting whether a pressure differential in the pipeline between the said injector arrangement an adjacent injector arrangement is above or below a threshold value.

In use, each injector arrangement may be operable to increase the flow rate at which conveying gas is injected into the pipeline from an injection flow rate to an increased injection flow rate, when a detected pressure differential a predetermined number of injector arrangements upstream or downstream thereof rises above the threshold value.

Accordingly, the injector arrangements can respond to very small pressure differentials along the conveying pipeline, as result from small decreases in the permeability of the conveyed material. Such localised pressure differentials may also occur when a plug of material forms and arrives at one of the injector arrangements.

This facilitates stable and predictable conveying of the particulate material and a lower overall amount of conveying gas is required for each unit mass of particulate material conveyed. Thus, the energy requirements of the system are reduced.

The threshold pressure differential between adjacent injector arrangements is also independent of position along the conveying pipeline, the material being conveyed and of the absolute pressure conditions within the conveying pipeline.

In addition, the injector arrangements are independently operable, enabling the system to respond to two more detected pressure differentials at the same time.

It has been found to be particularly effective when each injector arrangement is operable to increase the flow rate at which conveying gas is injected into the pipeline, when the detected pressure differential is a predetermined number of injector arrangements upstream thereof.

This finding is contrary to the approach adopted in existing systems, in which gas is injected at or upstream of a detected pressure abnormality in a conveying pipeline. Instead, the injection flow rate is "pre-emtively" increased downstream of a region of locally decreased material permeability so that it's permeability is decreased as it arrives, and before a material plug or blockage properly forms.

Each injector arrangement may be operable to increase the flow rate at which conveying gas is injected into the pipeline, when the detected pressure differential is between it and an adjacent injector arrangement.

Alternatively or in addition, each injector arrangement may be operable to increase the flow rate at which conveying gas is injected into the pipeline, when the detected pressure differential is between two further injector arrangements adjacent one another.

The flow rate of the $n^{th}$ injector arrangement may be increased based on a pressure differential between the $(n+m)^{th}$ and the adjacent $(n+m+1)^{th}$ injector arrangement—i.e. based on a downstream pressure differential.

Advantageously, the flow rate of the $n^{th}$ injector arrangement may be increased based on a pressure differential between the $(n-m)^{th}$ and the adjacent $(n-m-1)^{th}$ injector arrangement—i.e. based on an upstream pressure differential.

The value of m may be 0, 1 or 2 and in some cases more than 2.

The pressure differential apparatus may in some embodiments be configured to also perform as fault detection apparatus, or a component part thereof.

However, a lower (or upper) threshold pressure difference (or indeed any other pressure difference giving rise to a further pilot signal, disclosed above) is distinct from the threshold value of a said pressure differential that causes an injector to change between a flow rate and an increased flow rate. Typically, a lower (or upper) threshold pressure difference is far greater than the a said threshold pressure differential, for example 1, 2 or more orders of magnitude greater.

The apparatus may comprise one or more terminal injector arrangements, by which we mean injector arrangements at or near the inlet or the outlet of the pipeline, such that a pressure differential above the threshold value cannot be detected a predetermined number of injector arrangement upstream or downstream thereof, because the terminal injector arrangements have fewer than the predetermined number of injector arrangements upstream or downstream thereof, as the case may be.

The terminal injector arrangements may be configured differently from the other, non-terminal injector arrangements.

For example, where m=2 and the system is configured for the plurality of (non-terminal) injector arrangements to respond to detected above-threshold pressure differentials upstream thereof, the first and second injector arrangements along the pipeline may be terminal injector arrangements and may lack the ability to increase the flow rate of injected conveying gas. Alternatively, the second (terminal) injector arrangement may increase the injection flow rate based on a pressure differential to the adjacent first (terminal) injector arrangement.

The terms upstream and downstream, inlet, outlet and other such relative terms are expressed in relation to the direction in which the particulate material is intended to be conveyed in normal use of the system.

By "permeability" of conveyed particulate material, we refer to the resistance that is imposed against a flow of conveying gas through the pipeline.

The system may comprise a transporter apparatus for delivering a quantity of particulate material under a system pressure of a conveying gas, to the inlet of the conveying pipeline. In use the system pressure is maintained (e.g. by way of a compressor) at a pressure above the pressure at the outlet. For example, the outlet may be at ambient pressure and the system pressure may be at a higher pressure. The system may be a pressurised pneumatic conveying system.

The system may comprise a receiving vessel, such as a hopper, for receiving particulate material from the conveying pipeline. In use the receiving vessel may be maintained at a pressure below the pressure at the inlet. The inlet may be at ambient pressure and the receiving vessel may be at a reduced pressure. For example the receiving vessel may communicate with a vacuum pump for pumping conveying gas from the receiving vessel. The system may be a vacuum pneumatic conveying system.

For the avoidance of doubt, references herein to "the detected pressure differential" refer to the detected pressure differential a predetermined number of injector arrangements upstream or downstream of a said injector arrangement.

Each injector arrangement may be configured to reduce the flow rate at which conveying gas injected into the pipeline from the increased injection flow rate to the injection flow rate, when the detected pressure differential falls below the threshold value.

It will be appreciated that, at least temporarily, the increased injection flow rate may be associated with a local increase in conveying gas pressure, as the particulate material locally adjusts to the new conditions.

Indeed, the pressure at which the conveying gas is injected may increase or decrease with injection flow rate. For example, at the injection flow rate, the injection pressure may be lower than the increased injection pressure at the increased injection flow rate. Thus, in use, each injector arrangement may be operable to increase the pressure at which conveying gas is injected into the pipeline from an injection pressure to an increased injection pressure, when the said pressure differential rises above the threshold value.

The conveying gas may be injected at the increased injection flow rate for around 0.0001 to 5 seconds, or around 0.0001 to 3 seconds, or around 0.0001 to 2 seconds, or around 0.0001 to 1 second. In some circumstances, the conveying gas is injected at the increased injection flow rate for around 0.5 seconds.

The length of time for which an injection injects conveying gas at the increased injection flow rate may depend on how long it takes for pressures within the conveying pipeline to re-equilibrate. Factors determining for how long the increased injection flow rate is used, include the degree to which the permeability of the particulate material has decreased (e.g. how much a plug has compacted), the position of a region of decreased permeability in relation to an injector arrangement, or how long it takes for a plug to be "aerated" or broken apart, so as to increase permeability.

Each injector arrangement may be operable to inject conveying gas into the pipeline at the injection flow rate, when the detected pressure differential is below the threshold value, and to inject conveying gas into the pipeline at the increased injection flow rate, when the detected pressure differential rises above the threshold value.

Each injector arrangement may be configured to reduce the flow rate at which the conveying gas is injected as soon as the detected pressure differential falls below the threshold value.

Alternatively, there may be a delay between the detected pressure differential falling below the threshold value and the reduction in the flow rate at which the conveying gas is injected. Thus, the flow rate at which the conveying gas is injected may remain at the increased injection flow rate of a selected time period after as soon as the detected pressure differential falls below the threshold value, in particular in relation to embodiments having a said control unit or units by which the injection flow rate of the conveying gas is controlled.

The threshold pressure differential may be of the order of millibars. For example the threshold pressure differential may be between around 0.1 and 1000 mBar, or between around 1 and 500 mBar, or between around 5 and 200 mBar, or between around 10 and 100 mBar.

Some particulate materials may stably progress along a conveying pipeline as a series of permeable plugs, without this leading to blockage. In certain circumstances, the increased injection flow rate may be triggered whenever a material plug passes between adjacent injector arrangements. When the system is configured in this way, the temporarily increased injection flow rates from each injector arrangement in turn (as the plug progresses along the pipeline) may again be regarded as a preventative measure against pipeline blockage or unstable conveying of the particulate material.

The system pressure, and/or the difference in pressure between the inlet and the outlet, and/or the injection flow rate may vary depending on, for example, the conveying pipeline length and diameter, the nature of the particulate material being conveyed, ambient temperature in the pipeline and other factors as known to one skilled in the art.

The system pressure (i.e. absolute pressure) may for example be in the range from 0.1 to 100 Bar, or between around 0.5 to 20 Bar. The injection flow rate at an injector arrangement may for example be in the range from around 0.0001 to 100 $m^3$/min, or 0.01 to 100 $m^3$/min (based on the equivalent volume of air at atmospheric pressure), or in the range from around 0.1 to 60, or 55 $m^3$/min. In some embodiments, the injection flow rate can be around 0.01 $Sm^3$/min.

The system may be configured such that the system pressure may be the same as the injection pressure, so that the system pressure never exceeds the injection pressure, or so that the system pressure is always below the injection pressure.

The injection flow rate (and/or pressure) of an injector arrangement may exceed the injection flow rate/pressure of an adjacent injector arrangement downstream thereof. For example, the flow rate of conveying gas may progressively increase or decrease along the conveying pipeline form the inlet to the outlet. Alternatively, the flow rates and pressures at which conveying gas is injected may be the same at each injector arrangement.

The increased injection flow rate may cause a localised pressure build up in the conveying pipeline sufficient to cause a local increase in particulate material permeability. The increased injection flow rate may cause a localised pressure build up in the conveying pipeline sufficient to dislodge a material plug which has become blocked in the conveying pipeline. Injecting conveying gas at the increased injection flow rate may disrupt a material plug so as to reduce its size, or aerate or to some degree fluidize the plug, so as to increase its permeability.

The increased injection pressure may be selected for example based on the nature of the conveyed material, the pipeline dimensions, the system or injection pressures, temperature and the like.

The increased injection flow rate is typically at least 2, 3, 5, 7 or 10 or more times the injection flow rate. For example, where the injection flow rate is around 0.01 $Sm^3$/min, the increased injection flow rate may in come embodiments be between around 0.02-0.1 $Sm^3$/min, e.g. around 0.07 $Sm^3$/min.

In order to achieve the increased injection flow rate, the increased injection pressure at which the injector arrangement injects conveying gas may typically be between around 0.1 to 3 Bar higher than the injection pressure. Alternatively, a larger flow area may be employed, so as to achieve a greater flow rate for a given injection pressure.

The pressure differential apparatus may be configured to detect whether the pressure differential in the pipeline between an injector arrangement an adjacent injector arrangement upstream and/or downstream thereof, is above or below a threshold value.

The pressure differential apparatus may be configured to detect a pressure differential between adjacent injector arrangements, for example between portions of the injector arrangements in fluid communication with the conveying pipeline. The pressure differential apparatus may be configured to detect a pressure differential between respective regions of the conveying pipeline proximal to the adjacent injector arrangements.

The pressure differential apparatus may be configured to detect pressure differential information.

Pressure differential information may comprise an indication that the pressure differential is above or below the threshold value, or may comprise a value of a pressure differential, or a property related thereto. For example, a pressure differential information may comprise the configuration of a device sensitive to a pressure differential, or may comprise a signal output by an electrical or electromechanical device sensitive to a pressure differential, such as a piezoelectric device. A device of this nature may also be capable of detecting adverse pressure difference information, from which a fault condition may be identified.

Each injector arrangement may comprise pressure differential apparatus. Advantageously, the pressure differential apparatus may be located upstream of the continuous flow of conveying gas being injected into the pipeline. In this way, the pressure differential apparatus is protected from contamination, damage or wear that might otherwise result from contact with particulate material being conveyed in the pipeline. In turn, this facilitates the use of more sensitive pressure differential apparatus.

A pressure differential apparatus of a said injector arrangement may be in fluid pressure communication with an adjacent injector arrangement (upstream and/or downstream thereof) or with an inside of the conveying pipeline proximal to an adjacent injector arrangement.

A pressure differential apparatus of a said injector arrangement may be configured to respond to pressure differential information (such as the configuration of a device sensitive to a pressure differential) so as to regulate the injection flow rate into the conveying pipeline.

A pressure differential apparatus of a said injector arrangement may alternatively or in addition be configured to convey pressure differential information to a further injector arrangement a predetermined number of injector arrangements upstream and/or downstream thereof. The pressure differential information may be conveyed directly (e.g. an electrical signal) or indirectly (e.g. a pressure in a line resulting from the operation of a pressure differential sensitive device such as a valve).

For example, a pressure differential apparatus may comprise a valve coupled to a pressure differential actuator, such as a diaphragm or a piston actuator. A first side of the pressure differential actuator may be in fluid communication with an injector arrangement (or the conveying pipeline proximally thereto), and a second side of the pressure differential actuator may be in fluid communication with an adjacent injector arrangement (or the conveying pipeline proximally thereto).

On detection of a pressure differential above the threshold pressure differential between the first and second sides of the pressure differential actuator, the valve may be actuated so as to change the flow rate at which the conveying gas is injected by the injector arrangement, or by an injector arrangement upstream or more preferably downstream thereof, as discussed further herein. A pressure differential apparatus may comprise a differential pressure transducer, operable to output a signal indicative that the threshold pressure differential has been exceeded, or indicative or related to a pressure differential and, in some embodiments, a signal related to an adverse pressure difference or a fault condition.

A pressure differential apparatus of an injector arrangement may be configured to convey pressure differential information (and in some embodiments adverse pressure difference information) to two or more injector arrangements upstream and/or downstream thereof.

A pressure differential may be determined based on measurements of pressure or a related property, by pressure sensors associated with adjacent injector arrangements. Such pressure sensors may in some embodiments also be capable of detecting a lower threshold pressure condition, or other a fault condition as disclosed herein, and accordingly may be in communication with a said piloted shut-off valve.

The system may comprise a control unit in communication with pressure sensors of (or associated with) adjacent injector arrangements, operable to determine whether the threshold pressure differential is exceeded. The control unit may be in communication with sensors associated with more than two of, or each of the injector arrangements. The control unit may be in communication with one or more or all of the piloted-shut off valves, and be configured to issue one or more types of pilot signal thereto.

Each injector arrangement may comprise a control unit.

The flow rate adjustment arrangement may comprise an adjustable device such as an adjustable valve (e.g. a needle valve, ball valve, adjustable aperture valve or the like) or an adjustable flow controller or restrictor, or an adjustable nozzle. In some embodiments, such adjustable devices are electromechanically actuated. In some embodiments, such adjustable devices are pressure-actuated; i.e. under the action of fluid pressure (e.g. as a consequence of a said fluid pressure differential).

In some embodiments, the injector arrangements are supplied with conveying gas from a high pressure manifold (the manifold being at a pressure at or above the pressure at which conveying gas is supplied to the pipeline). The flow rate adjustment arrangements may be configured to vary the setting of an adjustable device, so as to vary a pressure drop between the manifold and the gas injected into the conveying pipeline, and thus the flow rate of the injected conveying gas.

Each injector arrangement may comprise a high flow rate injection pathway and a low flow rate injection pathway, between a source of conveying gas (e.g. manifold) and the conveying pipeline. Each flow rate adjustment arrangement may be configured to selectively route the conveying gas via the high flow rate injection pathway (for example comprising a large area flow restrictor, or no flow restrictor), or via the low flow rate injection pathway (for example comprising a small area flow restrictor).

The flow rate adjustment arrangement may be configured to selectively open either the low flow rate injection pathway only, or to open both the high and low flow rate injection pathways.

The flow rate adjustment arrangement may comprise one or more injection pathway selection valves, operable to regulate flow through the high and/or low flow rate injection pathways.

In some embodiments, therefore, the low flow rate injection pathway remains open to the source of conveying gas at all times. In this case, when both flow pathways are open (e.g. when a said injection pathway selection valve positioned in a bypass, as disclosed below, is open), a greater proportion of conveying gas will flow through the bypass and so the increased injection flow rate occurs.

This arrangement reduces the risk that the flow of conveying gas from the injector arrangement into the conveying pipeline could be interrupted, for example by slow or out of sequence operation of an injection pathway selection valve, or while a valve spools between positions.

Accordingly, the invention extends in a second aspect to a system for conveying particulate material, comprising:
- a conveying pipeline having an inlet for receiving a quantity of particulate material and conveying gas, and an outlet; the system being configured to maintain the inlet at a higher pressure of conveying gas than the outlet;
- a plurality of injector arrangements along the conveying pipeline, for injecting a continuous flow of conveying gas into the pipeline; and
- each injector arrangement associated with a pressure apparatus for detecting pressure conditions in the conveying pipeline;
- each injector arrangement having a high flow rate injection pathway and a low flow rate injection pathway, between a source of conveying gas and the conveying pipeline;
- and a flow rate adjustment arrangement configured to selectively open either the low flow rate injection pathway only, or to open both the high and low flow rate injection pathways;
- in use, the flow rate adjustment arrangement operable open both the high and low flow rate injection pathways and thereby increase the flow rate at which conveying gas is injected into the pipeline from an injection flow rate to an increased injection flow rate, on detection by the pressure apparatus of pressure conditions in the conveying pipeline indicative of locally decreased material permeability;
- wherein each injector arrangement further comprises a piloted shut-off valve positioned between the flow rate adjustment arrangement and the conveying pipeline and operable to close in response to a received pilot signal indicative of a pressure condition in the conveying pipeline below a lower threshold pressure condition.

The low flow rate injection pathway may comprise both a large area flow restrictor and a small area flow restrictor. For example, the high low flow rate injection pathway may comprise a bypass of at least a portion of the low flow rate injection pathway (e.g. of the small area flow restrictor).

The flow rate adjustment arrangement may be configured to prevent flow through the bypass. For example, an injection pathway selection valve may be positioned in the bypass.

The shut-off valve may be positioned downstream (in relation to the flow of gas through the injector arrangement) of the said pathways. The shut-off valve may be position immediately upstream of the conveying pipeline, in relation to the direction of flow of gas through the injector arrangement. The shut-off valve may be positioned immediately upstream of a nozzle for injecting conveying gas from the nozzle into the pathway. Accordingly, shut-off valve is operable to protect the flow rate adjustment arrangement (for example any injection pathway selection valves present) from debris carried in the conveying pipeline.

The injector arrangement may optionally include a passive (i.e. not piloted) non-return valve as a further safeguard against contamination of the injector arrangement by materials in the conveying pipeline. A non-return valve may be upstream or more typically downstream of the shut-off valve.

Each shut-off valve may incorporate, or be operable to function as, a non-return valve.

The flow rate adjustment arrangement may comprise a multi-way (e.g. 2-way or 3-way) injection pathway selection valve, operable to select the high or low flow rate injection pathway.

The multi-way injection pathway selection valve may be disposed in the bypass.

The multi-way injection pathway selection valve may be pressure-actuated. For example, the multi-way injection pathway selection valve may be coupled to or comprise a diaphragm actuator or a pressure differential piston actuator.

The multi-way injection pathway selection valve may be electromechanically actuated.

An electromechanically actuated adjustable device may comprise or communicate with a control unit.

In some embodiments, each injector arrangement comprises a control unit for controlling an electromechanically actuated or adjustable device, based on received pressure differential information. Said control unit may form part of the flow rate adjustment arrangement. In some embodiments, a single control unit is configured to control more than one of or all of the flow rate adjustment arrangements.

A said control unit may communicate with both pressure differential apparatus and a flow rate adjustment arrangement (and as mentioned above, in some embodiments a piloted shut-off valve or valves).

It will be appreciated that such electronic control may be effected in a variety of ways, with signals being communicated between electromechanical devices and/or pressure differential apparatus, and one or more control units associated with the injector arrangements.

The system may comprise a processing resource, forming part of a control unit or issuing control instructions to one or more said control units, based on pressure differential information and/or adverse pressure difference information. For example the system may comprise a computer processor, or one or more computer processors in communication with one another. The system may comprise associated computer apparatus, such as programmable or fixed memory and the like.

In some circumstances, the increase of the injection flow rate, on detection of an above-threshold pressure differential, as described above, may not be sufficient to move or disrupt a material plug. Under such circumstances, it may be required to further increase the injection flow rate.

One way that this can be achieved is to further increase the injection flow rate locally, at a said injector arrangement (e.g. by further adjustment of a flow rate adjustment arrangement).

Alternatively, or in addition, under some circumstances it may be required to increase the injection flow rate at a group of, or at all of, the injector arrangements. The system may be configured to detect such circumstances and increase injection flow rate accordingly.

The system may for example be configured to determine a system pressure. A system pressure may be determined based on pressure measurements from a series of pressure sensors along the conveying pipeline (e.g. an average value).

The system pressure may be measured by a pressure sensor at the inlet or in the transporter apparatus. A pressure measurement at the inlet or transporter apparatus may be indicative of resistance to delivering particulate material into the conveying pipeline.

An increase in system pressure for longer than a predetermined period may indicate a need to increase the injection flow rates along the pipeline. For example, if the system pressure remains elevated for longer than, for example between around 1 and 180 seconds, or between 1 and 120 seconds, or between around 1 and 60 or 5 and 60 seconds, the flow rates along the pipeline may be increased.

Other indications may include detecting above-threshold pressure differentials at or above a certain frequency, or detecting greater than a certain number of above-threshold pressure differentials at a given time. A need to increase injection flow rate may be determined based on a combination of such indications.

On detection of a system pressure above a predetermined system pressure threshold, the injection flow rate at one or more, or in some cases all, of the injector arrangements may be increased (for example to the increased injection flow rate).

In embodiments in which a high pressure of conveying gas is supplied to the injector arrangements, typically via a manifold, supply pressure may be increased on detection of an elevated system pressure. Increase of the supply pressure in this way may cause the injection flow rate to increase (for example where the injector arrangements comprise flow restrictors). Indeed, a supply pressure increase may also cause the system to operate at a generally higher pressure.

It may be preferable for the injection flow rates to be elevated temporarily, following which the system pressure can again be monitored to determine whether it returns to normal.

The above described feedback between the injection flow rate(s) and system pressure may provide a mechanism by which the system calibrates, so as to find a system pressure and injection flow rate suitable for a particular type of particulate material. For example the injection flow rate and system pressure may be progressively increased until the rate or number of above-threshold pressure differentials is at an acceptable level.

As disclosed herein, a measurement of system pressure may also lead to the identification of a fault condition, and it should be understood that the upper threshold pressure condition will normally be above, and typically substantially above any above-threshold pressure which might cause a further increase in injection flow rate.

It will be understood that certain of the modes of operation described herein are effected by way of the one or more control units and/or processing resources. For example, control over multiple injector arrangements together, or delays to monitor the effects of a change in injection flow rate, increased injection flow rate, system pressure and the like, may be facilitated by electronic control over said parameters.

The system may comprise any suitable type of transporter apparatus as known in the art. For example, the transporter apparatus may comprise; a pressure vessel having an inlet port, for receiving particulate material; an outlet port extending to the conveying pipeline through which particulate material may be delivered under a pressure of conveying gas; and a conveying gas inlet, through which the pressure vessel may be pressurised to the system pressure.

The inlet port may comprise a pressure isolation valve, such as a rotary valve or material shut off valve.

In use, the pressure of conveying gas in the transporter apparatus may be elevated to the system pressure, prior to delivering an amount of the particulate material into the pipeline. The pressure of conveying gas in the transporter may be maintained at the system pressure.

The transporter apparatus may be gravity fed with particulate material, for example from a hopper. The system may for example comprise a hopper having an outlet above the inlet port of the transporter (optionally connected via a length of a conduit).

The inlet port and outlet port are typically electronically regulated, for example by a control unit. The conveying gas inlet may in some embodiments also be electronically controlled, so as to regulate the system pressure. The conveying gas inlet may be pneumatically controlled, to regulate the system pressure. Such pneumatic control or a pneumatically controllable device may be controlled by way of a control unit.

Said control unit, or a processing resource issuing instructions thereto, may form part of or communicate with controller(s)/processing resource(s) associated with the injector arrangements as described herein.

Conveying gas may be provided to the various parts of the system (the transporter apparatus, each of the injector arrangements, a manifold and so forth) from a single source. For example the system may be connected or connectable to a source of a compressed gas, such as a compressed gas cylinder or, more commonly, a compressor.

The system may comprise a compressor.

The conveying gas may be any suitable gas. Most typically, the conveying gas is air. However, other gasses may be preferred for certain applications. For example, an inert gas such as nitrogen or carbon dioxide may be used to convey perishable or oxygen-sensitive materials.

The conveying pipeline may have a straight, curved or convoluted pathway.

The injector arrangements may be equally spaced along the conveying pipeline, or along portions of the conveying pipeline. The pathway of the pipeline may require that the spacing of the injector arrangements varies in some parts of the pipeline. For example, particulate material may be more prone to blocking at bends in the pipeline, which may therefore benefit from a closer spacing of injector arrangements in their vicinity. The spacing may be selected according to the particular application, and may depend of factors such as pipeline diameter, gradient and so forth.

The injector arrangements are spaced typically at around 1 m to 20 m apart along the conveying pipeline, or between around 1-12 m, or 1-6 m apart. The spacing may be for example around 6 m, or 12 m between adjacent injector arrangements.

The conveying pipeline may comprise more than one outlet. For example the pipeline may comprise two or more outlets and be configured such that particulate material may be directed selectively to one of the outlets.

The conveying pipeline may comprise more than one inlet, and apparatus associated therewith; for example to facilitate transport of more than one type of particulate material.

The system may be a dense phase conveying system, for transporting dense phase particulate materials such as sodium sulphate, sodium carbonate, sand, gypsum, alumina, metallurgical coke, clinker, metallic dust and concentrates, or other inorganic salts, catalyst substrates and the like.

The system of the first or second aspect may comprise more than one pressure apparatus.

A pressure apparatus may be associated with more than one injector arrangement. For example, a pressure apparatus may be associated with adjacent injector arrangements or a series of injector arrangements.

In some embodiments, each injector apparatus is associated with a separate pressure apparatus.

Each injector apparatus may comprise a pressure apparatus.

In a third aspect of the invention there is provided an injector arrangement for injecting conveying gas into a particulate material conveying pipeline, the injector arrangement comprising:
 a pressure apparatus for detecting pressure conditions in a said conveying pipeline;
 an injector outlet, for connection to a said conveying pipeline, through which in use a continuous flow of conveying gas may be injected into the pipeline;
  the injector arrangement comprising a flow rate adjustment arrangement operable to increase the flow rate at which conveying gas is injected from the injector outlet, from an injection flow rate to an increased injection flow rate, on detection by the pressure apparatus of pressure conditions in the conveying pipeline indicative of locally decreased material permeability;
 wherein each injector arrangement further comprises a piloted shut-off valve positioned between the flow rate adjustment arrangement and an outlet for connection to a conveying pipeline and operable to close in response to a received pilot signal indicative of a pressure condition in the conveying pipeline below a lower threshold pressure condition.

The outlet may for example comprise a nozzle, for injecting gas into the conveying pipeline.

The injector arrangement may comprise a pilot line in pressure communication with the shut-off valve.

For example, the/each shut-off valve may be open if static pressure in the pilot line is above a lower threshold pressure, and/or below an upper threshold pressure or between an upper and a lower threshold pressure (and otherwise closed).

Each pilot line may, in use, extend from a pilot manifold of a conveying system.

The pilot line may be in pressure communication (directly or via a diaphragm or piston actuator or the like) with; an upstream part or the inlet to the injector arrangement; or a manual "shut-off" device.

The pilot line may be for connection in use to a part of a conveying system, such as an upstream part or the inlet to the conveying pipeline; a manifold supplying conveying gas to the injector arrangement; a transporter; a source of conveying gas for the system.

The fault detection apparatus may comprise the pilot line.

The pressure apparatus may be pressure differential apparatus for detecting whether a pressure differential is above or below a threshold value.

The injector arrangement may be operable to increase the flow rate at which conveying gas is injected from the injector outlet, when the pressure differential apparatus detects a pressure differential above the threshold value.

Pressure differential information may be received from the pressure differential apparatus. Thus, the injector arrangement may be operable to increase the flow rate at which conveying gas is injected from the injector outlet, from an injection flow rate to an increased injection flow rate, when the said pressure differential rises above the threshold value.

The pressure differential information may in use be received from another pressure differential apparatus, for example from another injector arrangement. The injector arrangement may therefore be connectable with another pressure differential apparatus.

In a fourth aspect of the invention there is provided an injector arrangement for injecting conveying gas into a particulate material conveying pipeline, the injector arrangement comprising:
 a pressure apparatus for detecting pressure conditions in a said conveying pipeline;
 an injector outlet, for connection to a said conveying pipeline, through which in use a continuous flow of conveying gas may be injected into the pipeline;
 a high flow rate injection pathway and a low flow rate injection pathway, between a source of conveying gas and the conveying pipeline; and
 a flow rate adjustment arrangement configured to selectively open either the low flow rate injection pathway only, or to open both the high and low flow rate injection pathways;
 in use, the flow rate adjustment arrangement operable open both the high and low flow rate injection pathways and thereby increase the flow rate at which conveying gas is injected into the pipeline from an injection flow rate to an increased injection flow rate, on detection by the pressure apparatus of pressure conditions in the conveying pipeline indicative of locally decreased material permeability;
 wherein each injector arrangement further comprises a piloted shut-off valve positioned between the flow rate adjustment arrangement and an outlet for connection to the conveying pipeline and operable to close in response to a received pilot signal indicative of a pressure condition in the conveying pipeline below a lower threshold pressure condition.

According to a fifth aspect of the invention there is provided a method of conveying particulate material along a conveying pipeline, the method comprising;
  introducing a quantity of the particulate material into the pipeline;
  conveying the particulate material along the pipeline under the action of a flow of a conveying gas along the conveying pipeline;
  injecting a continuous flow of conveying gas into the pipeline at a plurality of injection locations along the pipeline;
  monitoring pressure conditions in the conveying pipeline;
  monitoring the conveying pipeline and/or associated apparatus for conveying the particulate material for a fault condition; and
  increasing the flow rate of the conveying gas injected into the pipeline at a said location, from an injection flow rate to an increased injection flow rate, on detection by the pressure apparatus of pressure conditions in the conveying pipeline indicative of locally decreased material permeability; and
  closing a piloted shut-off valve to stop the flow of injected conveying gas at an injection location, by sending a pilot signal to the shut-off valve on detection of a pressure condition in the conveying pipeline below a lower threshold pressure condition.

The method may comprise detecting a fault condition, by detecting an adverse pressure condition or an adverse flow condition, and sending a further pilot signal to the shut-off valve.

The method may comprise opening (or re-opening) the shut-off valve on detection of a pressure condition in the conveying pipeline above the lower threshold pressure condition (and/or by detecting an end of a fault condition).

The method may comprise detecting a fault condition by detecting a pressure condition in the conveying pipeline above an upper threshold pressure condition. As disclosed herein, a fault condition may be detected by detecting a local pressure above a threshold value or below a threshold value, such as a pressure in a part of the injector arrangement; and/or by detecting a flow rate of conveying gas above or below a threshold flow rate, such as into or along the conveying pipeline, into or out of a transporter, or through an injector arrangement, etc.

The method may comprise detecting a fault condition by detecting two or more flow or pressure conditions.

The method may comprise stopping the flow of injected conveying gas at each injection location, on detection of pressure conditions in the conveying pipeline below the lower threshold pressure condition, and/or on detection of a fault condition.

The method may comprise manually operating a said shut-off valve, or more than one or each shut-off valve.

The method may comprise reducing or increasing a pressure applied to a pressure actuated device (e.g. via a pilot line and/or a pilot manifold), to operate a said shut-off valve.

The method may comprise increasing the flow rate of the conveying gas injected into the pipeline at a said location, from an injection flow rate to an increased injection flow rate when a pressure differential rising above a threshold value is detected in the pipeline between adjacent injection locations a predetermined number of injection locations upstream or downstream thereof.

The method may comprise detecting pressure differentials between each adjacent injection location.

The flow rate at the said injection location may be increased when the detected pressure differential is between it and an adjacent injection location.

The flow rate at the said injection location may be increased when the detected pressure differential is between two further injection locations adjacent one another.

The flow rate at the $n^{th}$ injection location may be increased based on a pressure differential between the $(n+m)^{th}$ and the adjacent $(n+m+1)^{th}$ injection location; or based on a pressure differential between the $(n-m)^{th}$ and the adjacent $(n-m-1)^{th}$ injection location. The value of m may be 0, 1 or 2 and in some cases more than 2.

The method may comprise conveying the particulate material under the action of a system pressure of conveying gas, applied for example at or upstream of the inlet to the pipeline. Alternatively (or in addition) the method may comprise causing a reduced pressure at the outlet of the conveying pipeline, for example by pumping conveying gas from a receiving vessel downstream of the outlet.

The method may comprise decreasing the flow rate of the conveying gas injected into the pipeline at a said injection location, from the increased injection flow rate to the injection flow rate, after a fixed time period, for example after around 0.0001 to 5 seconds, or around 0.0001 to 3 seconds, or around 0.0001 to 2 seconds, or around 0.0001 to 1 second, or after around 0.5 seconds.

The method may comprise decreasing the flow rate of the conveying gas into the pipeline at a said injection location, from the increased injection flow rate to the injection flow rate, when the detected pressure differential falls below a threshold value.

The flow rate may be decreased as soon as the detected pressure differential falls below the threshold value.

The method may comprise further increasing the increased injection flow rate at an injection location, or at a group of injection locations.

The method may comprise injecting conveying gas into the conveying pipeline at the injection flow rate along a low flow rate injection pathway and increasing the flow rate to an increased injection flow rate by injecting conveying gas into the conveying flow rate along a high flow rate injection pathway.

The method may comprise injecting the conveying gas into the conveying pipeline at the increased injection flow rate along both the high flow rate and the low flow rate injection pathways at the same time.

In a sixth aspect, the invention extends to a method of conveying particulate material along a conveying pipeline, the method comprising;
  introducing a quantity of the particulate material into the pipeline;
  conveying the particulate material along the pipeline under the action of a flow of a conveying gas along the conveying pipeline;
  injecting a continuous flow of conveying gas into the pipeline at a plurality of injection locations along the pipeline at an injection flow rate along a low injection flow rate injection pathway;
  monitoring pressure conditions in the conveying pipeline; and, at least one said injection location, on detection by the pressure apparatus of pressure conditions in the conveying pipeline indicative of locally increased material permeability, increasing the flow rate to an increased injection flow rate by injecting conveying gas into the conveying flow rate along both the low injection flow rate injection pathway and a high flow rate injection pathway; and closing a piloted shut-off valve to stop the flow of injected conveying gas at an injection location, by sending a pilot signal to the shut-off valve on detection of a pressure condition in the conveying pipeline below a lower threshold pressure condition.

The method may comprise conveying a dense phase particulate material along the pipeline.

Further preferred and optional features of each aspect of the invention correspond to preferred and optional features of each other aspect of the invention. For example, a method disclosed herein may comprise steps associated with the operation of any of the preferred or optional features of any apparatus disclosed herein.

DESCRIPTION OF THE DRAWINGS

Non-limiting example embodiments will now be described with reference to the following drawings in which.

DETAILED DESCRIPTION OF EXAMPLE EMBODIMENTS

Figure 1A:
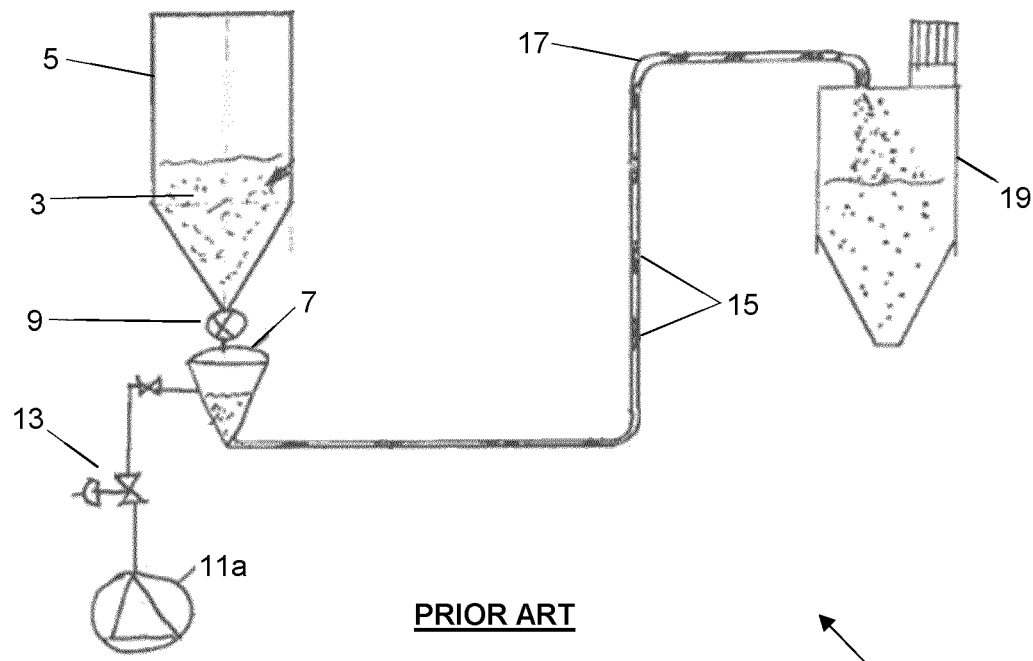
FIGS. 1(a) and 1(b) show schematic views of (a) a prior art pressurised pneumatic conveying system and (b) a prior art vacuum pneumatic conveying system.
Figure 1B:
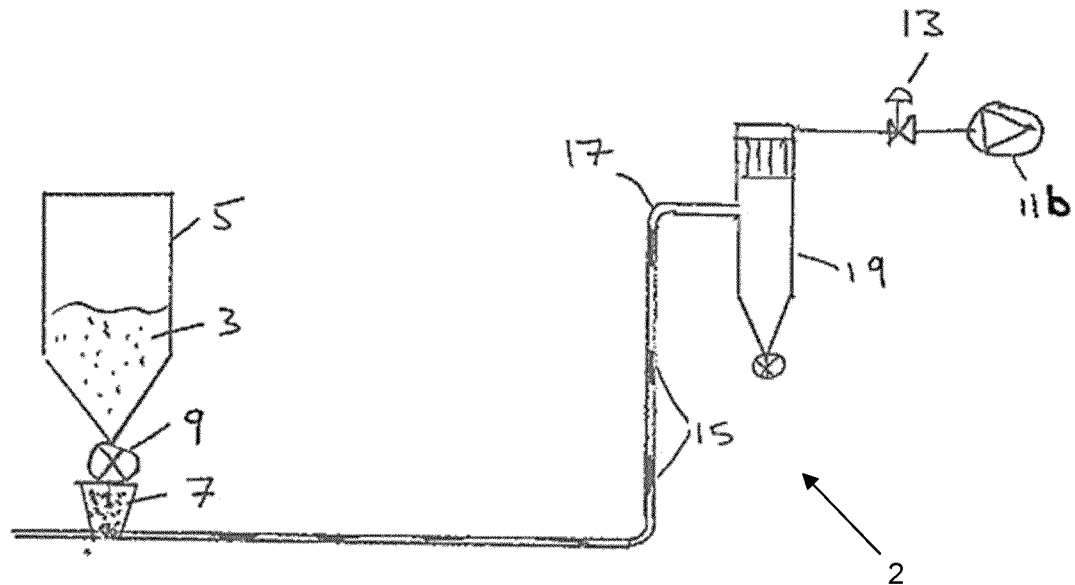
Figure 2:
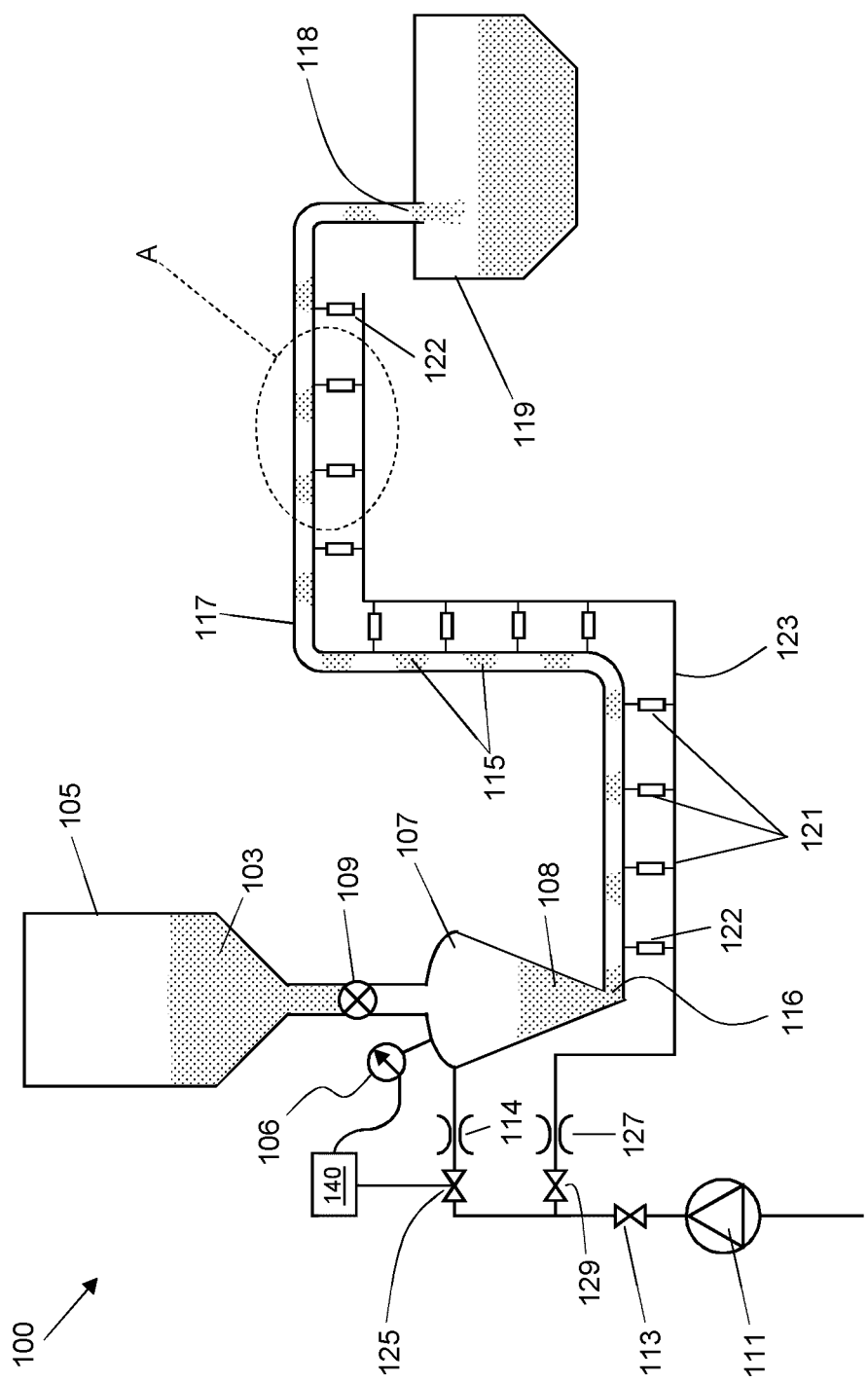
FIG. 2 shows schematic view of a conveying system having a plurality of injector arrangements along a conveying pipeline.

FIGS. 1(a) and (b) show a conventional dense phase pressurised and vacuum pneumatic conveying systems 1 and 2, as described above. FIG. 2 shows an embodiment of a system 100 for conveying particulate material in accordance with the invention. Features in common with the systems 1 and 2 are provided with like reference numerals, incremented by 100.

The system 100 has a transporter apparatus 107, for delivering a quantity of particulate material 108 into an inlet 116 of the conveying pipeline 117. Particulate material 103 is received into the transporter apparatus 107 from a hopper 105 positioned above the transporter apparatus, via a material shut-off valve 109. The transporter apparatus 107 is pressurised to a system pressure of conveying gas (in the present embodiment, compressed air) which is fed from a compressor 111 via conduit 112. The system 100 is typically coupled to a plant compressed air supply (of which the compressor 111 forms a part). The pressure of compressed air from the compressor is typically in the range from around 2.5 Bar to 12 Bar, and therefore much higher than the required system pressure of around 2 to 11 Bar of the system 100. Accordingly, a valve 113 and flow restrictor 114 regulates flow from the compressor. The system pressure may be further adjusted by adjustable valve 125, as described in further detail below.

The conveying pipeline 117 extends from the inlet 116 to an outlet 118, to a hopper 119.

In alternative embodiments, in which vacuum pneumatic conveying is employed (not shown), the transporter is at atmospheric pressure, and the pressure in a receiving vessel (in place of the hopper 119 in FIG. 2) is reduced by a vacuum pump.

A plurality of injector arrangements 121 are positioned along the conveying pipeline 117, and in use each inject a continuous flow of the conveying gas into the conveying pipeline. The injector arrangements 121 are supplied with compressed air from the compressor 111, via a high pressure manifold 123. A further flow restrictor 127 and adjustable valve 129 are positioned between the compressor and the manifold, to provide further regulation of the injected conveying gas, which will also be described in further detail below.

The system 100 includes pressure apparatus, in this case a pressure differential apparatus. Each of the injector arrangements includes pressure differential apparatus configured to detect a whether a pressure differential between each adjacent pair of injector arrangements is above or below a threshold value (an example of a pressure condition indicative of a locally decreased material permeability in the pipeline). Each injector arrangement 121 is operable to increase the flow rate at which conveying gas is injected into the pipeline 117 from an injection flow rate to an increased injection flow rate, when a said pressure differential rises above the threshold value.

Figure 3:
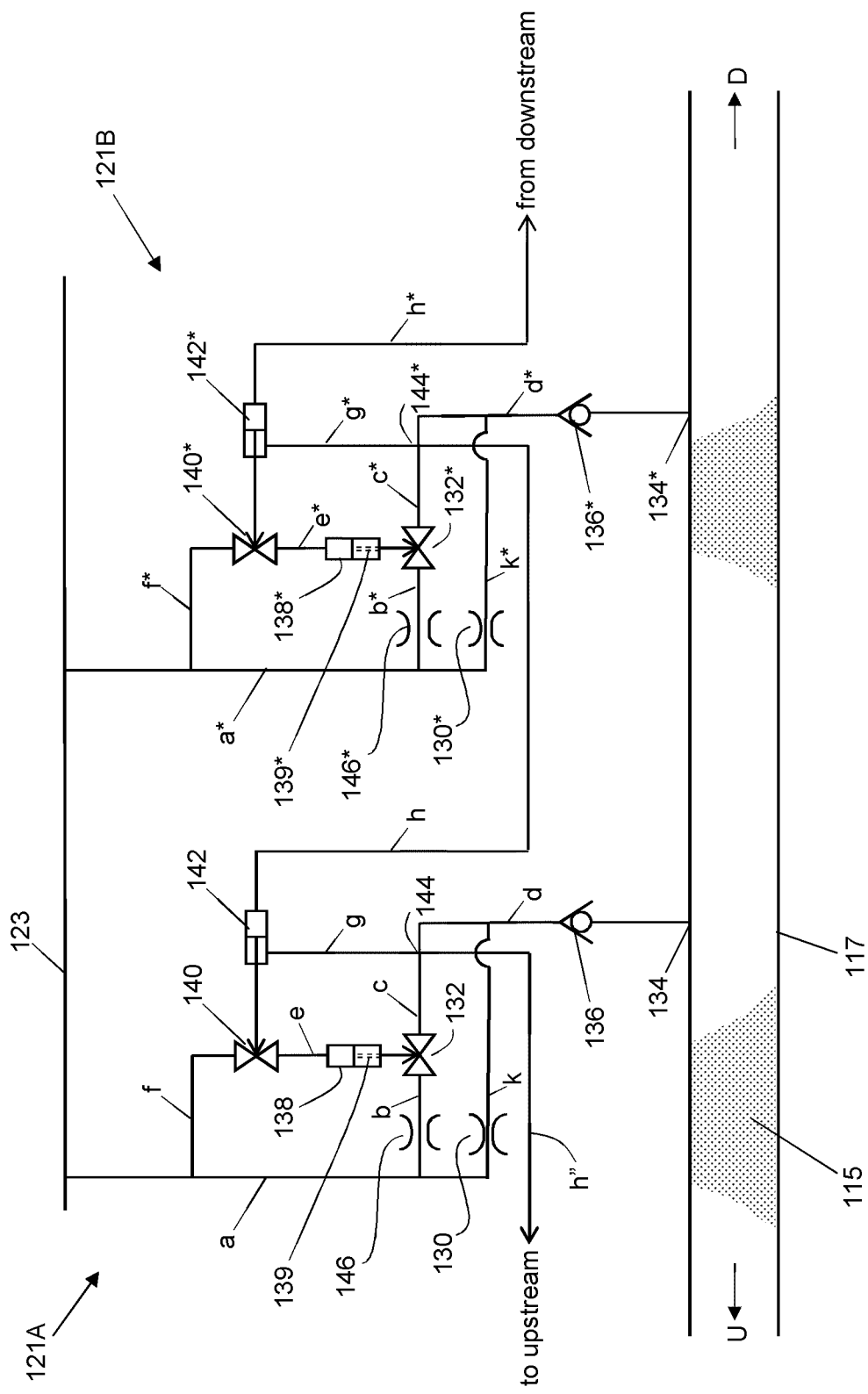
FIG. 3 shows an expanded schematic view of region A of FIG. 2, showing adjacent injector arrangements.

FIG. 3 shows a detailed schematic view of a region A of the system 100, including adjacent injector arrangements 121A and 121B. The downstream and upstream directions along the pipeline 117 are shown by arrows D and U, respectively. The reference numerals of injector arrangement 121B are marked with an asterisk.

The injector arrangement 121A has a low flow rate injection pathway in which compressed air (or other suitable conveying gas) is routed from the manifold 123, along gas lines a and k, and through a narrow (i.e. low flow area) flow restrictor 130, such that the compressed air can be directed through line d, to an injection nozzle 134 and injected into the pipeline 117. A non-return valve 136 is disposed along line d to prevent backflow from the pipeline. The narrow flow restrictor is typically of around 0.2 mm diameter, but the diameter can vary from around 0.01 to 3.0 mm, depending on the particular application.

The injector arrangement 121A also includes a high flow rate injection pathway, which extends from the manifold 123, via gas lines b and c which bypass the line k comprising the flow restrictor 130. A wider (i.e. high flow areas) flow restrictor 146 is positioned in line b and has a greater flow area than the flow restrictor 130. The wider flow restrictor 146 is typically of around 0.7 mm diameter, but depending on the particular application, the diameter can range from around 1.0 to 10.0 mm.

In alternative embodiments (not shown) no flow restrictor is present in the high flow rate injection pathway. Alternatively, the wider flow restrictor 146 may be located elsewhere in the high flow rate injection pathway, such as in the line d. Indeed the high and low flow area restrictors 130, 146 may be in series, and the high flow area flow restrictor 146 need now be in the bypass b, c at all, and may be the high flow area flow restrictor positioned in line d upstream of the non-return valve, but downstream of the junction with line k, as in the embodiment of FIG. 6 discussed below.

A piston actuated injection pathway selection valve, bypass valve 132 is positioned in the high flow rate injection pathway between lines b and c. The bypass valve 132 is actuated by a piston actuator 138. The piston of the actuator 138 is connected to a gas control line e. The position of the piston actuator 138, and thus the bypass valve 132, is determined by the relative forces applied to the piston in the actuator by a return spring and pressures in line e.

A control line f extends between the manifold 123 and a piston actuated injection pathway selection valve 140.

The valve 140 is actuated by a pressure-differential piston actuator 142. A first side of the piston actuator 142 is connected to gas line g. A second side of the actuator 142 is connected to gas line h. The position of the piston actuator 142, and thus the valve 140, is determined by the relative pressures in lines g and h. The piston actuator 142 comprises a resilient member such as a spring (not shown) which determines the threshold pressure differential required for it to change position. Optionally, the spring (or other suitable resilient member) may be adjustable, so that the threshold pressure differential can be adjusted.

Line g extends to 4-way junction 144 and is therefore in fluid pressure communication with line d. Accordingly, line g is at the same pressure as line d and thus reflects pressure in the pipeline 117 at the injection location 134.

Line h extends to the corresponding 4-way junction 144\* if the injector arrangement 121B, and so is at the pressure of line d\* and thus reflects the pressure in the pipeline at the injection location 134\*.

The pressure-differential piston actuators 142 and 142\* therefore function as the pressure differential apparatus of the respective injector arrangements 121A and 121B.

Operation of the system 100 to convey particulate material 115 along the pipeline 117 is generally as described below with reference to FIGS. 6(a)-(f).

When the system of FIG. 3 is shut down, for example for routine maintenance, the valve 113 can be closed and the compressor isolated (or itself shut down). Similarly, if required the material shut-off valve 109 may also be closed (or a valve at the pipeline inlet 116, if present).

Pressure then bleeds from the pipeline through the outlet 118. Pressure within the manifold 123 and each of the injector arrangements 121 also bleeds down, via the non-return valves 136.

Figure 4:
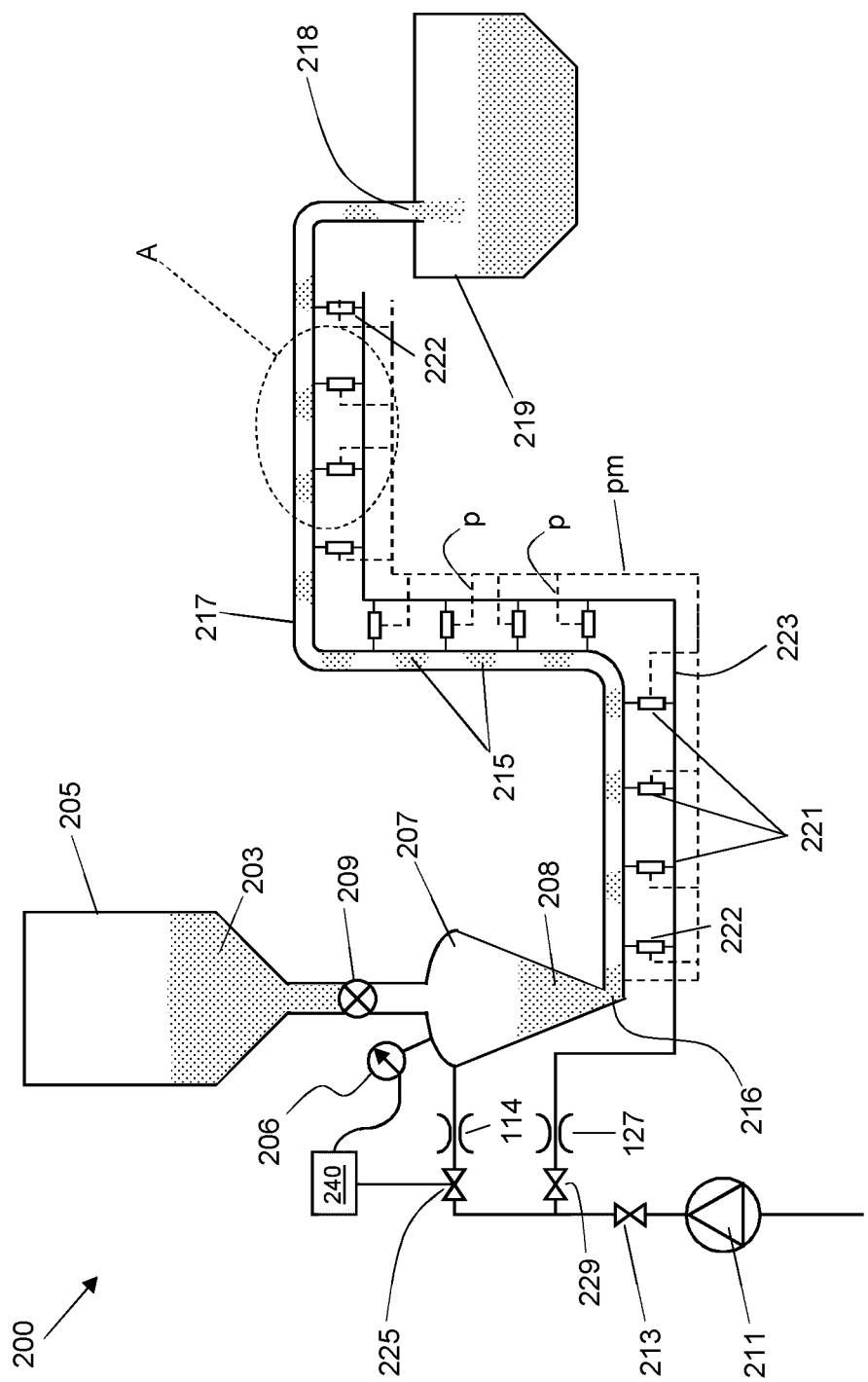
FIG. 4 shows schematic view of an alternative conveying system having a plurality of injector arrangements along a conveying pipeline.
Figure 5:
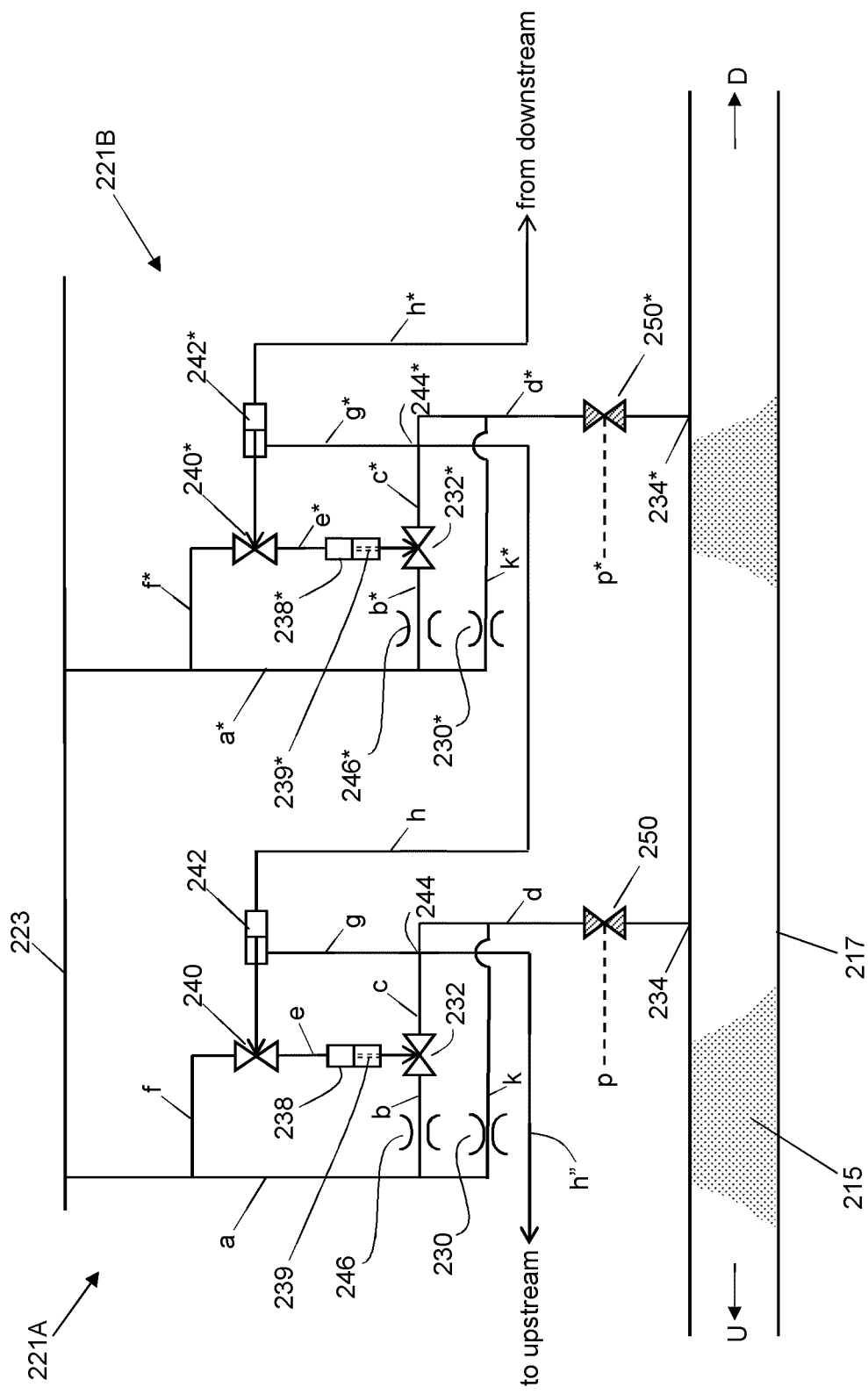
FIG. 5 shows an expanded schematic view of region A of FIG. 4.

FIGS. 4 and 5 show an alternative system 200. Features in common with the system shown in FIG. 3 are provided with like reference numerals, incremented by 100.

The system 200 further comprises a pilot manifold pm, connected and in pressure communication with the pipeline 217 close to the inlet 216. Each injector arrangement 221, 222 is connected to the pilot manifold pm by a pilot line p.

In alternative embodiments (not shown), each pilot line communicates with the compressor, locally with the conveying pipeline, and/or includes a manual shut-off valve or vent to depressurise the pilot manifold or a pilot line.

As shown in FIG. 5, each injector arrangement 221 (and also the terminal injector arrangements 222, now shown in FIG. 5), further includes a pressure actuated shut-off valve 250, in place of the non-return valve 136. The shut-off valves also function or incorporate non-return valves.

The shut-off valves 250 are maintained in an open position by nominal pressure in the pipeline 217 near the inlet 216. A lower threshold pressure for each valve 250 may be selected as required, as a proportion (for example 75% or 90%) of the nominal inlet pressure.

When the system 200 is shut down, and pressure bleeds from the conveying pipeline 217, the pressure in the manifold pm also drops, causing each of the shut-off valves to close once the lower threshold pressure is reached, thereby substantially preventing the injector arrangements from bleeding down. Once the pipeline is re-pressurised, the valves 250 will re-open and normal conveying operation may resume.

The shut-off valves will also close automatically if pressure in the pipeline 217 is lost unexpectedly, for example due to a leak.

The normal operation of the injectors 221 during material conveying will now be described with reference to FIG. 6.

Figure 6A:
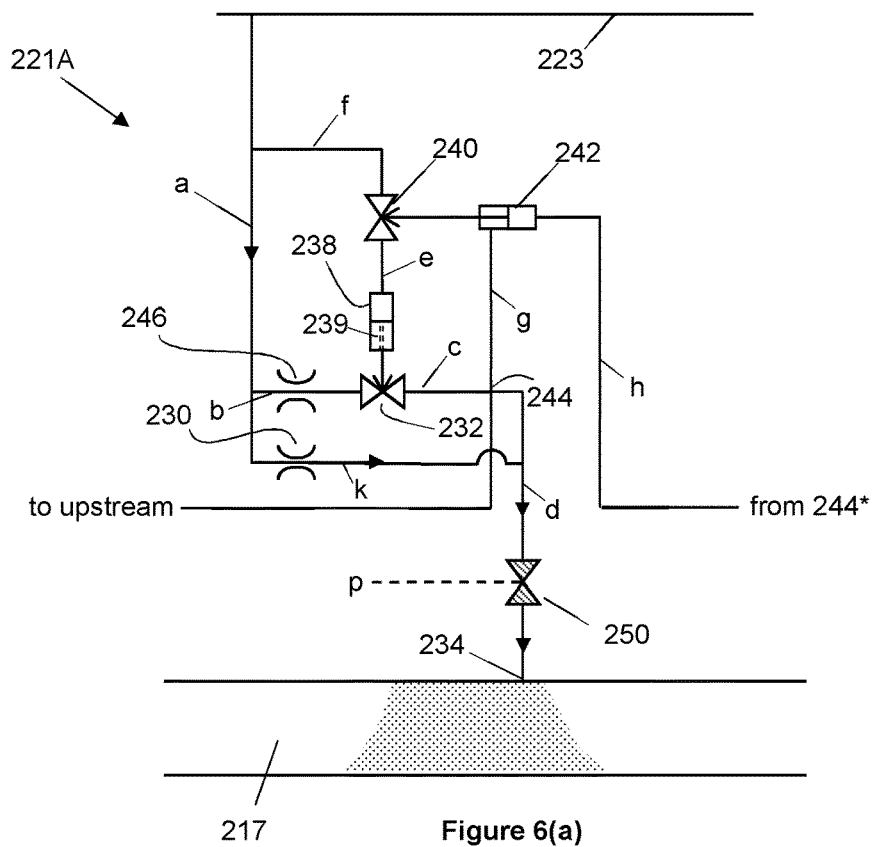
FIGS. 6(a)-(f) show the operation of the injector arrangements of FIG. 5.

FIG. 6(a) shows the configuration of the system when pressure in the pipeline at nozzle 234 is the same as the pressure in the pipeline at nozzle 234\*. In this configuration, the injection pathway selection bypass valve 232 is closed and compressed air flows along the low flow rate injection pathway, from the manifold 223 through lines a, k and d, to the nozzle 234 (as indicated by the arrows).

The pressure drops from the high pressure of the manifold 223, to the pressure in the conveying pipeline, across the flow restrictor 230.

Lines g and h are at the same pressure as the respective nozzles 234 and 234\*, such that the actuator 242 is in a position corresponding to injection pathway selection valve 240 being closed.

Figure 6B:
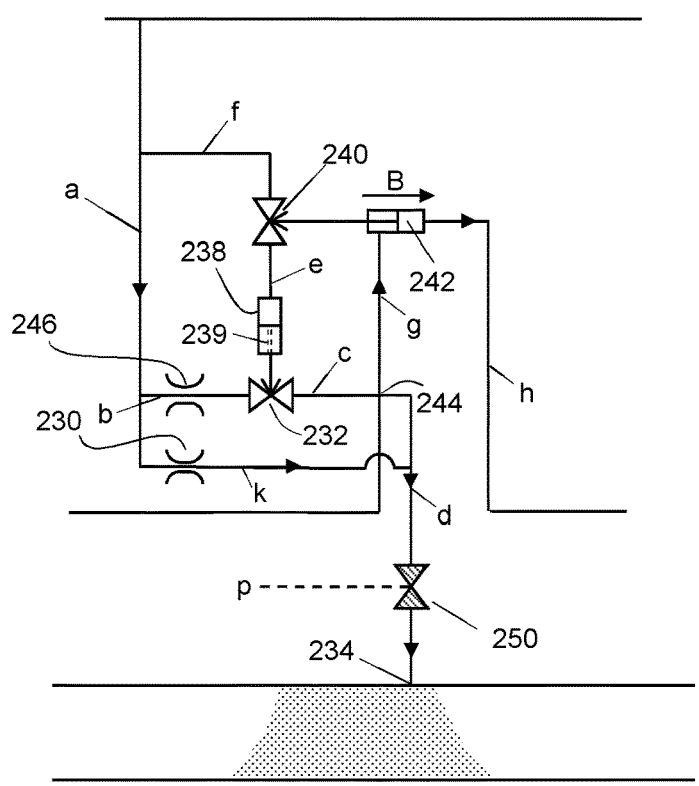

FIG. 6(b) shows the configuration of the injector arrangement2 when the permeability of material 215 reduces in a region of the pipeline. In this situation, there is small increased pressure in the pipeline in the vicinity of the nozzle 234. This results in increased pressure in lines d and g, such that there is an above-threshold pressure differential across the actuator 242. Under the action of the pressure differential, fluid from line g enters the first side of the actuator 242 and the piston moved in the direction B and displaces fluid from the second side of the actuator into line h.

Figure 6C:
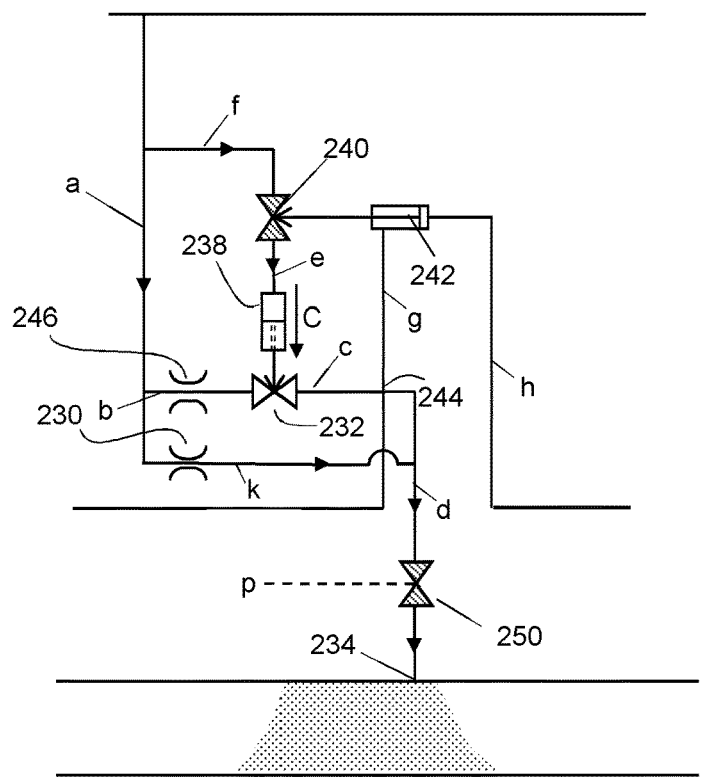

In turn, the movement of the actuator 242 causes the valve 240 to open, as shown in FIG. 6(c). Line f is at the high pressure of the manifold 223 and line a. Opening of the valve 240 causes fluid to flow through the valve and displace the piston of the actuator 238 in the direction C.

Pressure differential information can be considered to be constituted by one or more of:
- the position of the pressure differential actuator 242;
- the open/closed position of the valve 240;
- pressure in line e;
- the position of the actuator 238.

Figure 6D:
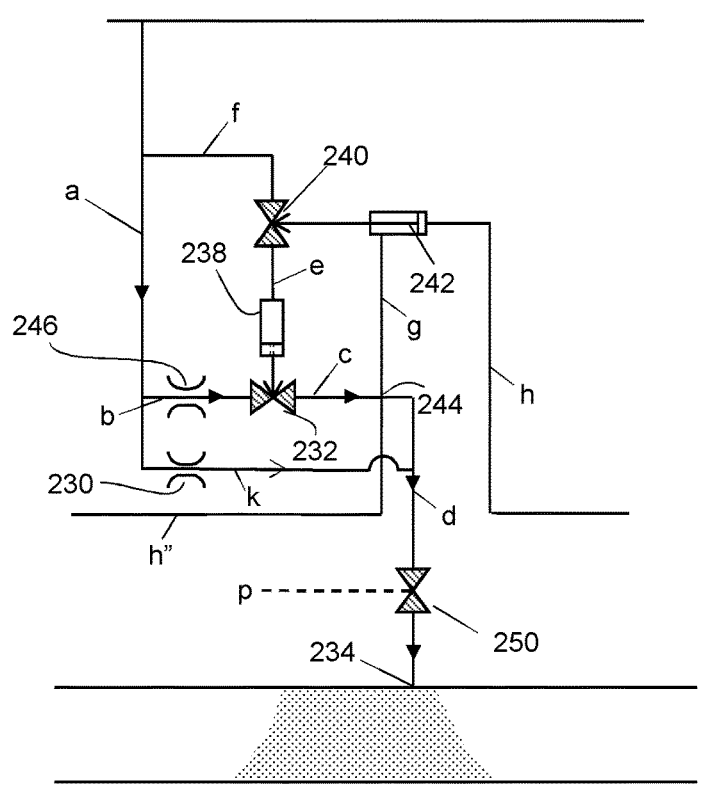
Figure 6E:
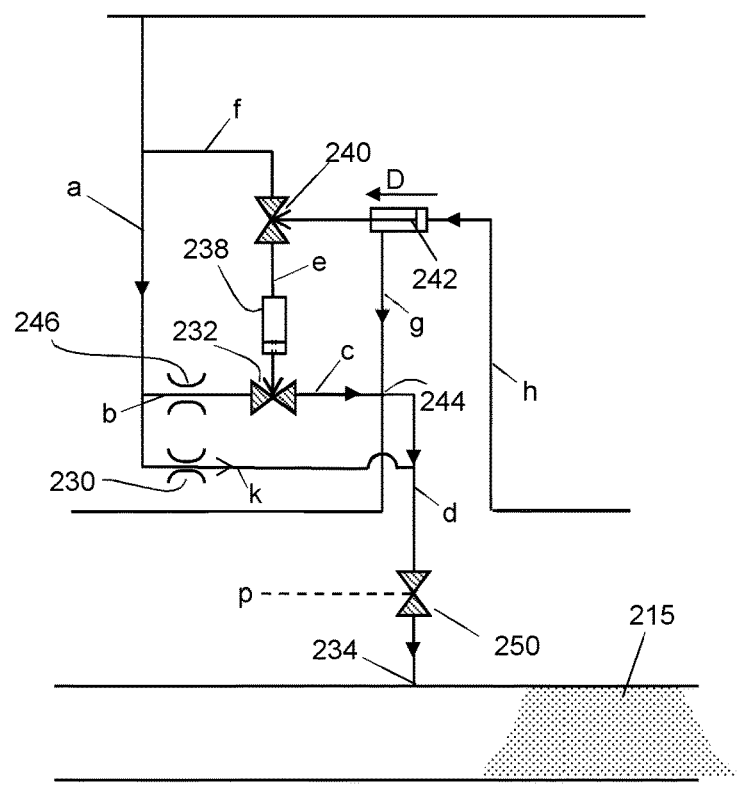

As shown in FIG. 6(d), the actuator 238 thereby switches the bypass valve 232 to open the high flow rate pathway along lines b and c, between lines a and d. The low flow rate pathway along line k remains open throughout, so as to maintain the continuous air flow through the nozzle 234. Due to the respective flow areas through the flow restrictors, the majority of the air now flows through the wider flow restrictor 246, and thus provides for the that the flow rate through the nozzle 234. The injection pathway selection valve 232 and the valve 240 thus form part of a flow rate adjustment arrangement.

The increase in the flow rate of the injected conveying gas may locally increase pressure in the pipeline, for example if the material 215 does not immediately increase in permeability. In that case, the pressure in line g also increases, such that the fluid pressure differential across the actuator 242 increases further. The pressure in line h", to an adjacent upstream injector arrangement (not shown) is then also increased, and so the pressure differential across the piston actuator of the upstream injector arrangement is negative, and that upstream injector arrangement is held in the configuration shown in FIG. 6(a).

The effect of the increased flow rate of air injected into the pipeline 217 through the nozzle 234, is to increase the permeability of the particulate material 215, or break apart, or move a plug of particulate material 215. In either case, the pressure in the pipeline equilibrates and the pressure differential across actuator 242 decreases below the threshold value. As a consequence, the piston in the actuator moves in the direction D, as fluid is displaced from line h and into line g (FIG. 6(e)).

Figure 6F:
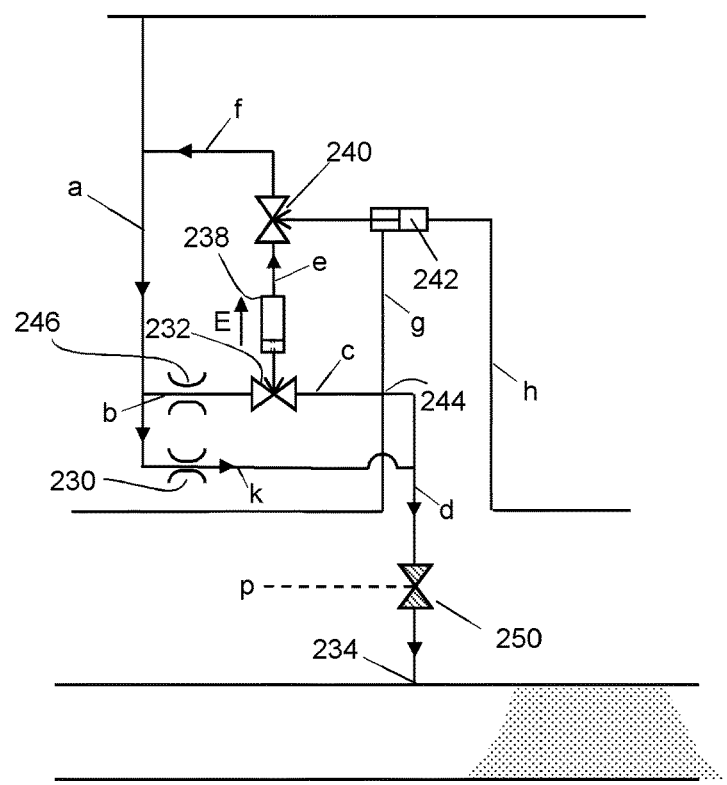

Referring now to FIG. 6(f), as the valve 240 closes, under the action of the actuator 242, air bleeds back through the valve from e into f, under the action of the sprung piston of the actuator 238 (in the direction E). This closes by bypass valve 232 and thus the high low rate injection pathway, and returns the injector arrangement 221A to the configuration shown in FIG. 6(a).

Accordingly, the injector arrangements 221 are configured to increase the flow rate at which compressed air is injected into the pipeline from an injection flow rate to an increased injection flow rate, when the said pressure differential rises above the threshold value, and to decrease the flow rate of the compressed air injected into the pipeline back to the injection flow rate, as soon as the detected pressure differential falls below the threshold value. The threshold value is set at around 10 mBar (although in some circumstances this may be set at as high as around 90 mBar), so as to ensure that air is flowing through the nozzles and into the pipeline at all times. This continuous flow prevents blockage or damage of the nozzles or any other parts of the injector arrangements, by the particulate material.

By incorporation of the non-return valve functionality, the valves 250 are also operable to close in response to a fault condition, in the form of a pressure in the conveying pipeline above an upper threshold pressure. The upper threshold pressure in this embodiment is set in relation to the pressure in line d. A small increase in pressure in the pipeline will not overcome the low flow rate through the nozzle 134. Moreover, such a pressure increase may also be associated with an increase in flow rate along the line d, and a concomitant pressure increase, whereby any potential blockage may be averted.

Nonetheless, should pressure for any reason (e.g. blockage, malfunction in the air supply) increase still further, sufficient to overcome the flow through d, then the valves 250 will close.

Referring again to FIG. 2, the transporter apparatus 107 is provided with a pressure gauge 106, to measure the system pressure in the transporter apparatus. As mentioned above, the set point of the system pressure, i.e. the pressure at which conveying gas is delivered to the transporter 107, is regulated by the solenoid valve 125. The setting of the solenoid valve may be controlled by a controller 140 which receives pressure readings from the gauge 106.

In alternative embodiments (not shown) the system may comprise a pneumatically adjustable valve in place of the solenoid valve 125. Alternatively, the valve may be manually adjustable.

The system 100 may also be configured for the controller 140 to regulate the set point of the air pressure in the manifold, for example to maintain the manifold pressure within a pre-set range (or the same as) of the system pressure. In the 100, 200, an increased manifold pressure has the effect of increasing both the injection flow rate and the increased injection flow rate. The pressures at which the conveying gas is injected increase or decrease commensurately.

In alternative embodiments, this can be achieved by way of variable flow restrictors in each of the injector arrangements, or in selected injector arrangements, as mentioned below.

The system 100 in addition includes terminal injector arrangements 122 near to the inlet and the outlet. Since these lack upstream and downstream adjacent injector arrangements, respectively, they differ from the injector arrangements 121. The terminal injector arrangement 122 nearest the inlet 116 may for example lack a line h", whereas the terminal injector arrangement 122 nearest the outlet need not be equipped with a pressure differential apparatus or means to adjust the injection flow rate. It will however be understood that in practice, it may be convenient for all of the terminal and non-terminal injector arrangements to be structurally the same, with redundant features of the terminal injector arrangements being disabled.

System 200 includes corresponding features (reference numerals incremented by 100).

Figure 7:
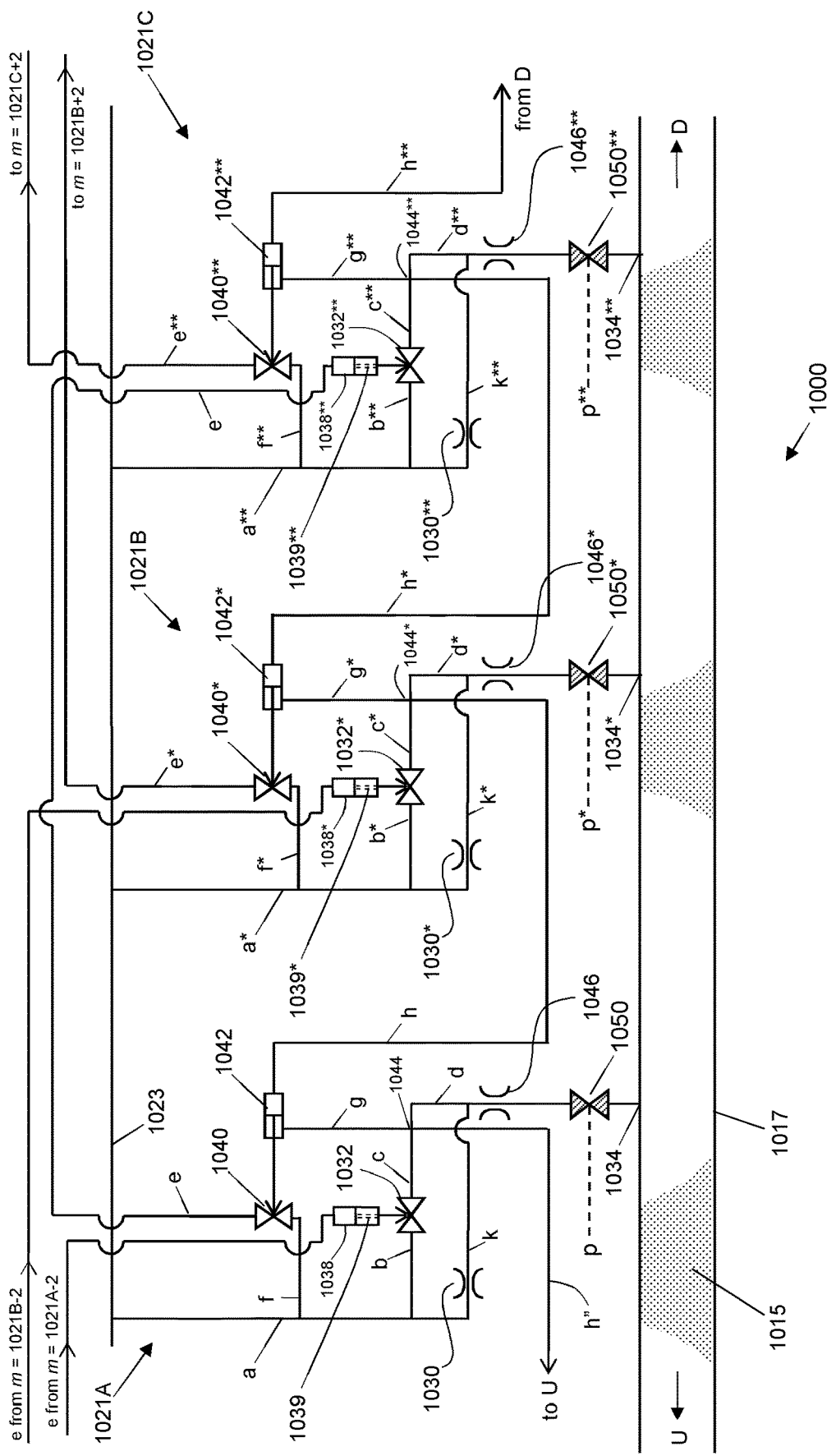
FIG. 7 shows an expanded schematic view of a region AA of the conveying pipeline of another embodiment of a conveying system, showing a series of three successive injector arrangements.

FIG. 7 shows an alternative embodiment of a series of injector arrangements 1021A, 1021B and 1021C of a system 1000 for conveying particulate material in accordance with the invention. Features in common with the system 200 are provided with like reference numerals, incremented by 800.

The downstream and upstream directions along the pipeline 1017 are shown by arrows D and U, respectively. The reference numerals of injector arrangement 1021B are marked with "*", and those of injector arrangement 1021C are marked with "**".

As described above in relation to the injector arrangement 121A of the system 100, the injector arrangement 1021A has a low flow rate injection pathway in which compressed air (or other suitable conveying gas) is routed from the manifold 1023, along gas lines a, k and d, to an injection nozzle 1034 and injected into the pipeline 1017. A narrow flow restrictor 1030 is positioned in line k. A non-return valve 1036 is disposed along line d to prevent backflow from the pipeline.

The injector arrangement 1021A also includes a high flow rate injection pathway extending from the manifold 1023 via bypass lines b and c. A injection pathway selection valve, bypass valve 1032 is positioned between lines b and c, such that the narrow flow restrictor 1030 can be selectively bypassed by opening the valve 1032, generally as described above.

A shut-off valve 1050 is positioned in line k, and held in an open position by pressure in a pilot line p. Together, the pilot line p and the associated manifold in pressure communication with the system pressure function as a fault detection apparatus.

A wide flow restrictor 1046 is in this example positioned in the line d upstream of the non-return valve 1036, but downstream of the junction with line k. Thus, air injected along both the high and low flow rate pathways passes through the flow restrictor 1046. However, when the bypass valve is closed and the low flow rate pathway only is in use, the narrow flow restrictor 1036 is the restricting parameter and so the wide flow restrictor 1046 has a negligible further influence on injection flow rate.

The bypass valve 1032 is actuated by a piston actuator 1038. The piston of the actuator 1038 is connected to a gas control line e that runs from an injector arrangement two injection locations upstream of the injector arrangement 1021A (not shown in the figure). Similarly, the injector arrangement 1021B has a piston actuator 1038* connected to a line e from an injector arrangement two injection locations upstream (and thus only on location upstream of the injector arrangement 1021A), whereas the line e of injector arrangement 1021A extends to the actuator 1038** of injector arrangement 1021C, two injection locations downstream.

The position of the piston actuator 1038, and thus the whether the bypass valve 1032 is open or closed, is determined by the relative forces applied to the piston in the actuator by a return spring and pressures in the line e extending from the upstream injector arrangement.

A control line f extends between the manifold 1023 and a piston actuated injection pathway selection valve 1040.

The valve 1040 is actuated by a pressure-differential piston actuator 1042. A first side of the piston actuator 1042 is connected to gas line g. A second side of the actuator 1042 is connected to gas line h. The position of the piston actuator 1042, and thus the valve 1040, is determined by the relative pressures in lines g and h. The piston actuator 1042 comprises a resilient member such as a spring (not shown) which determines the threshold pressure differential required for it to change position, as described above.

Line g extends to 4-way junction 1044 and is therefore in fluid pressure communication with line d. Accordingly, line g is at the same pressure as line d and thus reflects pressure in the pipeline 1017 at the injection location 1034.

Line h extends to the corresponding 4-way junction 1044*, and so is at the pressure of line d* and thus reflects the pressure in the pipeline at the injection location 1034*.

The pressure-differential piston actuators 1042, 1042* and 1042** function as the pressure differential apparatus of the respective injector arrangements.

Operation of the system 1000 is generally analogous to operation of the system 100. When pressure in the pipeline at nozzle 1034 is the same as the pressure in the pipeline at nozzle 1034*, compressed air flows along the low flow rate injection pathway of each of the injector arrangements 1021A-C, through their respective lines a, k, d (and a*, k*, d* and a, k, d respectively) to the nozzles 1034-1034.

The valve 1032 of the injector arrangement 1021A is by default closed, to close the bypass along lines b and c. Lines g and h are at the same pressure as the respective nozzles 1034 and 1034*, such that the actuator 1042 is in a position corresponding to valve 1040 being closed. The corresponding valves of the other injector arrangements are in the same configuration.

When a portion of the material 1015 of locally reduced permeability passes or occurs between the nozzles 1034 and 1034*, an above-threshold pressure differential may occur across the actuator 1042. Under the action of this detected pressure differential, fluid from line g enters the first side of the actuator 1042 fluid is displaced into line h.

This causes the valve 1040 to open. In the injector arrangements of the system 1000, opening of the valve 1040 exposes the line e the high pressure in line f (which is at the high pressure of the manifold 1023 and line a).

Unlike the injector arrangement 221A of system 200, in use of the injector arrangement 1021A, opening of the valve 1040 causes fluid to flow through the valve through line e and displace the piston of the actuator 1038** of the injector arrangement 1021C, two injector arrangements downstream.

This switches the bypass valve 1032 to open the high flow rate pathway between lines b and c, of the injector arrangement 1021C. The flow rate through the nozzle 1034 is then at the increased injection flow rate. The low flow rate pathway along line k** remains open at all times.

It is to be understood that the injection flow rate through each injector arrangement 1021 of the system 1000 is similarly regulated based on detected pressure differentials between two further adjacent injector arrangements upstream thereof (with the exception of terminal injector arrangements near the inlet or outlet of the conveying pipeline 1017).

In this way, the system 1000 ensures that reduced permeability material passes the injection location at an increased injection flow rate as it progresses downstream along the conveying pipeline 1017. The possibility of the reduced permeability region having progressed downstream of where injection flow rate is increased (as might happen during the period required for the system to respond to the detected pressure differential), is thus significantly reduced. In turn, this reduces the likelihood of exacerbating the reduction of particulate material permeability, or of forming or further compressing a material plug.

In common with the systems 100, 200, in use of the system 1000, once the detected pressure differential between injector arrangements 1021A and 1021B (or any two adjacent injector arrangements) falls below the threshold value, the differential pressure actuator 1042 returns to its original position, the valve 1040 closes and the pressure in line e falls, until the injector arrangement 1021C reverts to the lower injection flow rate.

It must be further appreciated that injector arrangements further upstream or downstream of the region of the system 1000 shown in FIG. 7 (and indeed the region A of the system 100) are capable of independently operating in this way. Thus, multiple transient variations in particulate material permeability can be simultaneously addressed so as to maintain stable conveying.

On detection of a fault condition (in the form of a loss of system pressure upstream, in the transporter or near the inlet to the conveying pipeline), the pressure in the pilot lines p, p*, and p** reduces and the respective shut-off valves 1050, 1050* and 1050** all close. The system 1000 responds generally as described above in relation to FIG. 3, with injection by injector arrangements at that time conjured to inject via the low flow rate injection pathway at the injection pressure stopping immediately, followed shortly thereafter by any injector arrangements at that time injecting at the increased injection flow rate, as their respective pressure differential switches 1042 cause the valves to close.

Whilst the invention has been described in connection with the foregoing illustrative embodiments, various modifications, additions and alterations may be made to the invention by one skilled in the art without departing from the scope of the claimed invention.

The invention claimed is:

1. A system for conveying particulate material, comprising:
 a conveying pipeline comprising:
  an inlet for receiving a quantity of particulate material and conveying gas; and
  an outlet; and
 a plurality of injector arrangements along the conveying pipeline for injecting a continuous flow of conveying gas into the pipeline,
 wherein the system is configured to maintain the inlet at a higher pressure of conveying gas than the outlet,
 wherein each injector arrangement is associated with a pressure apparatus for detecting pressure conditions in the conveying pipeline,
 wherein each injector arrangement comprises a flow rate adjustment arrangement operable to increase the flow rate at which conveying gas is injected into the pipeline from an injection flow rate to an increased injection flow rate, on detection by the pressure apparatus of pressure conditions in the conveying pipeline indicative of locally decreased material permeability, and wherein each injector arrangement comprises a piloted shut-off valve positioned between the flow rate adjustment arrangement and the conveying pipeline and operable to close in response to a received pilot signal indicative of a pressure condition in the conveying pipeline below a lower threshold pressure condition.

2. The system of claim 1, wherein the piloted shut-off valve of each injector arrangement is operable to open in response to a received pilot signal indicative of a pressure condition in the conveying pipeline above the lower threshold pressure condition.

3. The system of claim 1, wherein the lower threshold pressure condition is an absolute lower threshold pressure.

4. The system of claim 3, wherein the lower threshold pressure is a minimum conveying pipeline pressure.

5. The system of claim 1, wherein the lower threshold pressure condition is a lower threshold pressure difference between:
a pressure in a part of the injector arrangement and a pressure in the conveying pipeline;
an expected and an actual conveying pipeline pressure; or
the conveying pipeline pressure at its inlet and another, downstream, part of the conveying pipeline.

6. The system of claim 1, wherein the lower threshold pressure condition is related to the overall system pressure, or the pressure in the conveying pipeline.

7. The system of claim 1, wherein the shut-off valves are configured to operate simultaneously.

8. The system of claim 1, wherein the shut-off valve of each injector arrangement is connected to an electrical or pneumatic pilot line.

9. The system of claim 1, wherein each piloted shut-off communicates with a pneumatic pilot line, and wherein the pilot signal is a pressure signal;
selected from a decrease in pressure below a lower threshold pressure, a pressure pulse, a pressure difference.

10. The system of claim 9, wherein each pilot line extends from a pilot manifold.

11. The system of claim 1, wherein each shut-off valve is in communication with another part of the system selected from the group consisting of the conveying pipeline, an upstream part or the inlet to the conveying pipeline, an upstream part or the inlet to the respective injector arrangement, a transporter, a source of conveying gas for the system, a manifold supplying conveying gas to the injector arrangements, and a manual "shut-off" device.

12. The system of claim 1, wherein each shut-off valve is operable to close in response to one or more further pilot signals, wherein the one or more further pilot signals are indicative of one or more fault conditions.

13. The system of claim 12, wherein each piloted shut-off valve is operable to close in response to a received pilot signal indicative of a pressure condition in the pipeline above an upper threshold pressure condition.

14. The system of claim 12, comprising fault detection apparatus, operable to detect a fault condition or conditions.

15. The system of claim 1, wherein each injector arrangement comprises a high flow rate injection pathway and a low flow rate injection pathway, between a source of conveying gas and the conveying pipeline.

16. The system of claim 1, wherein the shut-off valve of each injector arrangement is positioned immediately upstream of the conveying pipeline, in relation to the direction of flow of gas through the injector arrangement.

17. An injector arrangement for injecting conveying gas into a particulate material conveying pipeline, the injector arrangement comprising:
a pressure apparatus for detecting pressure conditions in the conveying pipeline; and
an injector outlet for connection to the conveying pipeline, through which in use a continuous flow of conveying gas may be injected into the pipeline;
the injector arrangement further comprising a flow rate adjustment arrangement operable to increase the flow rate at which conveying gas is injected from the injector outlet, from an injection flow rate to an increased injection flow rate, on detection by the pressure apparatus of pressure conditions in the conveying pipeline indicative of locally decreased material permeability,
wherein each injector arrangement further comprises a piloted shut-off valve positioned between the flow rate adjustment arrangement and an outlet for connection to a conveying pipeline and operable to close in response to a received pilot signal indicative of a pressure condition in the conveying pipeline below a lower threshold pressure condition.

18. A method of conveying particulate material along a conveying pipeline, the method comprising;
introducing a quantity of the particulate material into the pipeline;
conveying the particulate material along the pipeline under the action of a flow of a conveying gas along the conveying pipeline;
injecting a continuous flow of conveying gas into the pipeline at a plurality of injection locations along the pipeline;
monitoring pressure conditions in the conveying pipeline;
monitoring the conveying pipeline and/or associated apparatus for conveying the particulate material for a fault condition;
increasing the flow rate of the conveying gas injected into the pipeline at the injection location, from an injection flow rate to an increased injection flow rate, on detection by the pressure apparatus of pressure conditions in the conveying pipeline indicative of locally decreased material permeability; and
closing a piloted shut-off valve to stop the flow of injected conveying gas at an injection location by sending a pilot signal to the shut-off valve on detection of a pressure condition in the conveying pipeline below a lower threshold pressure condition.

19. The method of claim 18, comprising detecting a fault condition by detecting an adverse pressure condition or an adverse flow condition and sending a further pilot signal to the shut-off valve.

20. The method of claim 19, comprising detecting a fault condition by detecting a pressure condition in the conveying pipeline above an upper threshold pressure condition.

* * * * *